(12) United States Patent
Cha et al.

(10) Patent No.: US 11,422,419 B2
(45) Date of Patent: Aug. 23, 2022

(54) DISPLAY DEVICE

(71) Applicant: Samsung Display Co., Ltd., Yongin-Si (KR)

(72) Inventors: Na Hyeon Cha, Yongin-si (KR); Sun Kwun Son, Suwon-si (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 17/106,712

(22) Filed: Nov. 30, 2020

(65) Prior Publication Data

US 2021/0364877 A1 Nov. 25, 2021

(30) Foreign Application Priority Data

May 25, 2020 (KR) .......................... 10-2020-0062529

(51) Int. Cl.
*G02F 1/1362* (2006.01)
*G02F 1/1368* (2006.01)

(52) U.S. Cl.
CPC ...... *G02F 1/136218* (2021.01); *G02F 1/1368* (2013.01); *G02F 1/136286* (2013.01)

(58) Field of Classification Search
CPC .......................... G02F 1/136286; G02F 1/1368
See application file for complete search history.

(56) References Cited

U.S. PATENT DOCUMENTS

| 10,473,994 | B2* | 11/2019 | Yeh ........................ G02F 1/1393 |
| 2014/0375534 | A1* | 12/2014 | Lee ....................... G09G 3/3648 345/87 |
| 2018/0046046 | A1* | 2/2018 | Feng ................... H01L 27/1288 |
| 2021/0208433 | A1* | 7/2021 | Ahn .................. G02F 1/134309 |

FOREIGN PATENT DOCUMENTS

| KR | 10-1534421 B1 | 7/2015 |
| KR | 10-2016-0090960 A | 8/2016 |
| KR | 10-2059788 B1 | 2/2020 |

* cited by examiner

*Primary Examiner* — Dung T Nguyen
(74) *Attorney, Agent, or Firm* — Innovation Counsel LLP

(57) ABSTRACT

A display device includes: a substrate; a gate line disposed on the substrate and extending in a first direction; a gate insulating layer disposed on the gate line; a data line disposed on the gate insulating layer and extending in a second direction crossing the first direction; a gate voltage supply line disposed on the gate insulating layer and extending in the second direction, the gate voltage supply line connected to the gate line; a passivation layer disposed on the data line and the gate voltage supply line; a shielding electrode disposed on the passivation layer; an insulating layer disposed on the shielding electrode; and a pixel electrode disposed on the insulating layer and overlapping the shielding electrode.

16 Claims, 16 Drawing Sheets

DISPLAY DEVICE

CROSS-REFERENCE TO RELATED APPLICATION

This application claims priority to and the benefit of Korean Patent Application No. 10-2020-0062529 filed in the Korean Intellectual Property Office on May 25, 2020, the entire contents of which are incorporated herein by reference.

BACKGROUND

1. Field

The present disclosure relates to a display device.

2. Description of the Related Art

A display device is a device for displaying an image, and includes a liquid crystal display (LCD), an organic light emitting diode (OLED) display, and the like. The display device is used in various electronic devices such as a mobile phone, a navigation device, a digital camera, an electronic book, a portable game machine, and various terminals.

The display device may include pixels arranged in a row direction and a column direction. Various elements such as a transistor and a capacitor may be disposed in each pixel, and various wires capable of supplying a signal to each pixel may be disposed in the display device. The wires may be connected to a driver to receive a signal, and the driver may be disposed at an edge of a display panel.

To reduce an area of a bezel, which is a portion in which a screen is not displayed on an edge of the display device, it may be considered to move a driver and the like disposed on left and right sides of the display device to another position. For example, the driver may not be disposed at the left and right sides of the display device, but the driver may be disposed at an upper side of the display device. In this case, a voltage supply wire for connecting the driver and the wire connected to each pixel may be disposed between the pixels, which may have an electrical effect on the display device.

The above information disclosed in this Background section is only for enhancement of understanding of the background of the described technology, and therefore it may contain information that does not form the prior art that is already known in this country to a person of ordinary skill in the art.

SUMMARY

The described technology has been made in an effort to provide a display device that may prevent an electrical effect caused by an additional wire while reducing a bezel area.

An embodiment provides a display device including: a substrate; a gate line disposed on the substrate and extending in a first direction; a gate insulating layer disposed on the gate line; a data line disposed on the gate insulating layer and extending in a second direction crossing the first direction; a gate voltage supply line disposed on the gate insulating layer and extending in the second direction, the gate voltage supply line connected to the gate line; a passivation layer disposed on the data line and the gate voltage supply line; a shielding electrode disposed on the passivation layer; an insulating layer disposed on the shielding electrode; and a pixel electrode disposed on the insulating layer and overlapping the shielding electrode.

The gate voltage supply line may be disposed on a same layer as the data line.

The display device may further include a liquid crystal layer disposed on the pixel electrode, and a common electrode disposed above or below the liquid crystal layer, wherein a same common voltage may be applied to the common electrode and the shielding electrode.

The shielding electrode may include a main electrode portion overlapping the pixel electrode, and a bridge portion disposed between adjacent main electrode portions and extending from the main electrode portion.

The main electrode portion may further overlap the data line and may not overlap the gate voltage supply line.

The bridge portion may overlap the gate voltage supply line.

The bridge portion may extend in the first direction, and a width of the bridge portion may be narrower than a width of the gate voltage supply line.

The bridge portion may not overlap the pixel electrode.

The display device may further include pixels arranged in a matrix form along the first direction and the second direction to be connected to the gate line and the data line, wherein three pixel columns in which pixels may be arranged along the second direction are disposed between adjacent gate voltage supply lines, and the main electrode portion may overlap three pixel electrodes.

The gate voltage supply line may be connected to two gate lines, one pixel column may be connected to two data lines to which data voltages of different polarities are applied, and the main electrode portion may overlap six data lines.

The display device may further include pixels arranged in a matrix form along the first direction and the second direction to be connected to the gate line and the data line, wherein one pixel column in which pixels are arranged along the second direction may be disposed between adjacent gate voltage supply lines, and the main electrode portion may overlap one pixel electrode.

The gate voltage supply line may be connected to two gate lines, one pixel column may be connected to two data lines to which data voltages of different polarities are applied, and the main electrode portion may overlap two data lines.

The display device may further include a thin film transistor connected to the gate line and the data line, and an opening in the shielding electrode so as to overlap the thin film transistor.

The thin film transistor may include a gate electrode connected to the gate line, a source electrode connected to the data line, and a drain electrode connected to the pixel electrode, and a pixel opening in the passivation layer and the insulating layer so as to overlap the drain electrode and the pixel electrode may be further included, wherein the pixel electrode may be connected to the drain electrode through the pixel opening, and the opening may overlap the pixel opening.

The opening may surround the pixel opening.

The shielding electrode may include a transparent metal oxide.

An embodiment provides a display device including: a substrate; a gate line and a data line disposed on the substrate and crossing each other; a gate voltage supply line disposed on the same layer as the data line and connected to the gate line; a thin film transistor connected to the gate line and the data line; a pixel electrode connected to the thin film transistor; and a shielding electrode disposed between the data line and the pixel electrode.

The shielding electrode may include a main electrode portion overlapping the pixel electrode, and a bridge portion disposed between adjacent main electrode portions and extending from the main electrode portion.

The main electrode portion may further overlap the data line and does not overlap the gate voltage supply line.

The bridge portion may overlap the gate voltage supply line and may not overlap the pixel electrode, and a width of the bridge portion may be narrower than a width of the gate voltage supply line.

According to the embodiments, it is possible to prevent an electrical effect due to an additional wire while reducing a bezel area.

DETAILED DESCRIPTION

Figure 1:
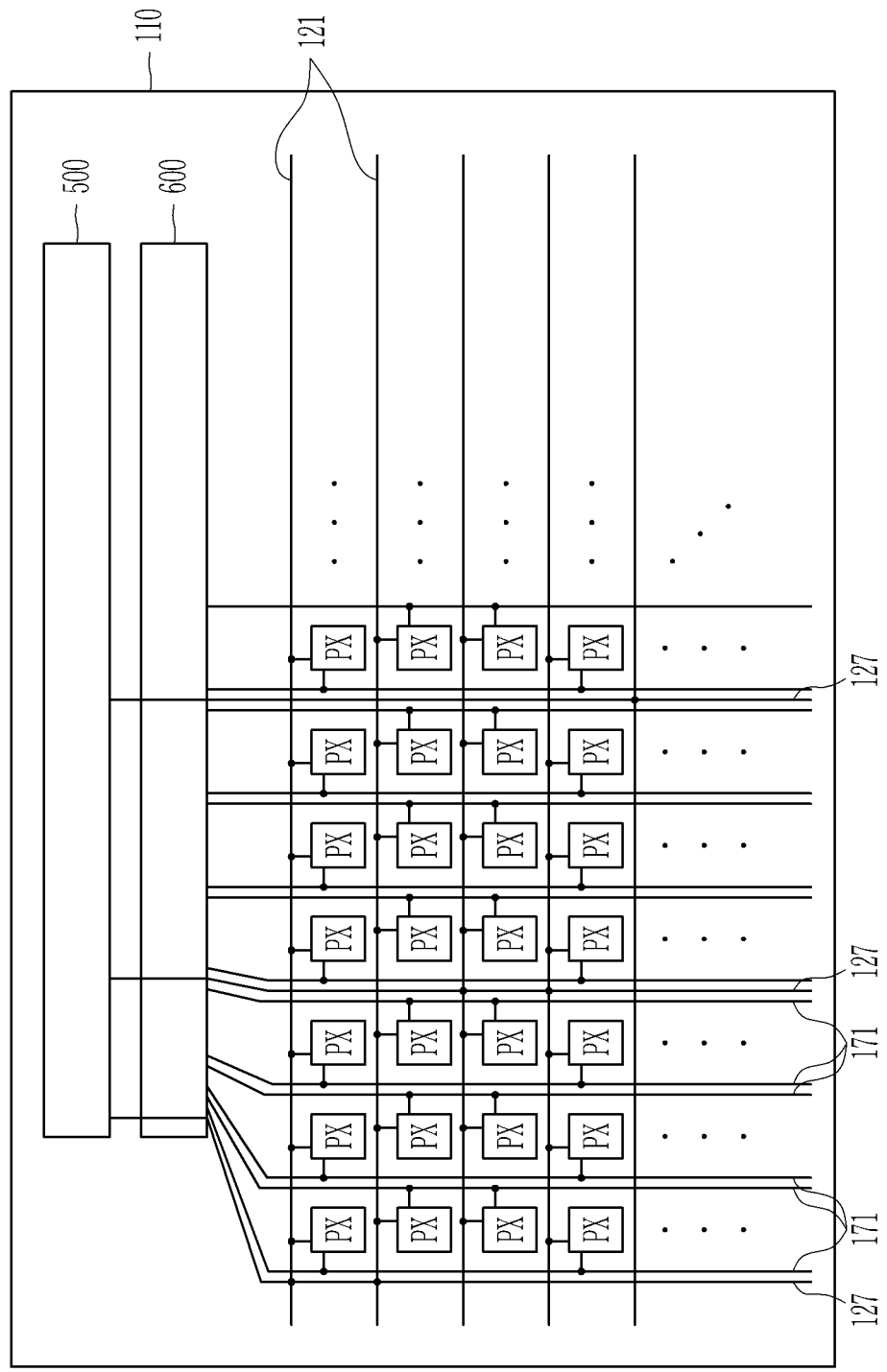
FIG. 1 illustrates a layout diagram of a display device according to an embodiment.

The inventive concept will be described more fully hereinafter with reference to the accompanying drawings, in which embodiments are shown. As those skilled in the art would realize, the described embodiments may be modified in various different ways, all without departing from the spirit or scope of the present disclosure.

Parts that are irrelevant to the description will be omitted to clearly describe the present disclosure, and like reference numerals designate like elements throughout the specification.

Further, in the drawings, the size and thickness of each element are arbitrarily illustrated for ease of description, and the present disclosure is not necessarily limited to those illustrated in the drawings. In the drawings, the thicknesses of layers, films, panels, regions, and other features, are exaggerated for clarity. In the drawings, for ease of description, the thicknesses of some layers and areas are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned or disposed on or above the object portion, and does not necessarily mean positioned or disposed on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

Further, throughout the specification, the phrase "in a plan view" or "on a plane" means viewing a target portion from the top, and the phrase "in a cross-section" or "on a cross-section" means viewing a cross-section formed by vertically cutting a target portion from the side.

First, a display device according to an embodiment will be described with reference to FIG. 1 and FIG. 2.

FIG. 1 illustrates a layout diagram of a display device according to an embodiment. FIG. 2 illustrates an equivalent circuit diagram of two adjacent pixels of the display device of FIG. 1 according to an embodiment.

As shown in FIG. 1, the display device according to an embodiment includes a first substrate 110, pixels PX disposed on the first substrate 110, and a gate driver 500 and a data driver 600 that generate signals for driving the pixels PX.

The pixels PX may be arranged in a matrix form along a row direction and a column direction. However, the structural form of the pixels PX is merely an example, and may be variously changed. The pixel PX is a unit for displaying an image. One pixel PX uniquely displays one of the primary colors, or pixels PX alternately display the primary colors according to time, thus a desired color may be displayed by a spatial or temporal sum of the primary colors.

The display device according to the embodiment may further include gate lines 121 and data lines 171 disposed on the first substrate 110. Each pixel PX is connected to a gate line 121 and a data line 171. The gate line 121 may mainly extend in a first direction, for example, a row direction, and the data line 171 may extend in a second direction, for example, a column direction, crossing the first direction. The gate line 121 and the data line 171 may be orthogonal to each other. The gate line 121 may transmit a gate signal, also referred to as a 'scan signal', that includes a gate-on voltage that turns on a transistor, which is a switching element, and a gate-off voltage that turns off the transistor. The data line 171 may transmit a data voltage corresponding to an image signal. The pixel PX may receive the data voltage from the data line 171 when the transistor is turned on.

Although not illustrated, the display device may further include a signal controller. The signal controller may control the gate driver 500 and the data driver 600. The signal controller receives an image signal and a control signal for the image signal from an external graphics processor (not shown). The control signal includes, for example, a horizontal synchronization signal, a vertical synchronization signal, a clock signal, a data enable signal, and the like. The signal controller may process the image signal according to an operating condition of the display device based on the image signal and the control signal, and then may generate and output image data, a gate control signal, a data control signal, and a clock signal.

The gate driver 500 may receive the gate control signal from the signal controller, generate a gate signal including a gate-on voltage and a gate-off voltage, and apply the generated gate signal to the gate line 121. The display device according to the embodiment may further include gate voltage supply lines 127 disposed on the first substrate 110. The gate voltage supply line 127 may mainly extend in a second direction for example, a column direction. The gate voltage supply line 127 may extend in a direction parallel to the data line 171 and may cross the gate line 121. The gate voltage supply line 127 may be connected to the gate driver 500 to receive a gate signal from the gate driver 500. The gate voltage supply line 127 may be connected to the gate line 121 to transmit a gate signal to the gate line 121. That is, the gate voltage supply line 127 is connected between the gate driver 500 and the gate line 121. The gate voltage supply lines 127 may extend parallel to each other, and one gate voltage supply line 127 may be connected to one or more gate lines 121. For example, each gate voltage supply line 127 may be connected to two gate lines 121. However, one gate voltage supply line 127 may be connected to one gate line 121 or three or more gate lines 121.

The data driver 600 receives a data control signal and image data from the signal controller, converts the image data into a data signal, e.g., data voltage, by using a gradation voltage generated by a gradation voltage generator (not shown), and applies the converted data signal to the data line 171. Two data lines 171 may pass between two adjacent pixels PX in a row direction. In addition, the data lines 171 may be disposed at both sides based on one pixel column. Some of the pixels PX included in one pixel column may be connected to the data line 171 disposed at a left side of the pixel column, and the remainder of the pixels PX included in the pixel column may be connected to the data line 171 disposed at a right side of the pixel column. For example, the pixels PX disposed in a first pixel row may be connected to the data line 171 disposed at the left side of the corresponding pixel PX, and the pixels PX disposed in a second pixel row may be connected to the data line 171 disposed at the right side of the corresponding pixel PX. In this case, the pixels PX disposed at the first and second pixel rows may receive the same gate signal from the same gate voltage supply line 127. The pixels PX disposed in a third pixel row may be connected to the data line 171 disposed at the right side of the corresponding pixel PX, and the pixels PX disposed in a fourth pixel row may be connected to the data line 171 disposed at the left side of the corresponding pixel PX. In this case, the pixels PX disposed at the third and fourth pixel rows may receive the same gate voltage from the same gate voltage supply line 127.

A data voltage of a positive polarity may be applied to some data lines 171, and a data voltage of a negative polarity may be applied to some other data lines 171. Data voltages of different polarities may be applied to two data lines 171 connected to one pixel column. In addition, data voltages having the same polarity may be applied to two data lines 171 disposed between two adjacent pixels in the row direction. For example, a data voltage of a positive polarity may be applied to the data line 171 disposed at the left side of two data lines 171 connected to the first pixel column, and a data voltage of a negative polarity may be applied to the data line 171 disposed at the right side of two data lines 171 connected to the first pixel column. In addition, a data voltage of a negative polarity may be applied to the data line 171 disposed at the left side of two data lines 171 connected to the second pixel column, and a data voltage of a positive polarity may be applied to the data line 171 disposed at the right side of two data lines 171 connected to the second pixel column. In addition, a data voltage of a positive polarity may be applied to the data line 171 disposed at the left side of two data lines 171 connected to the third pixel column, and a data voltage of a negative polarity may be applied to the data line 171 disposed at the right side of two data lines 171 connected to the third pixel column.

Three pixel columns may be disposed between adjacent gate voltage supply lines 127. However, the number of pixel columns disposed between adjacent gate voltage supply lines 127 may be variously changed. For example, one pixel column may be disposed between adjacent gate voltage supply lines 127, or two pixel columns may be disposed between adjacent gate voltage supply lines 127. The gate voltage supply line 127 may be disposed between two adjacent pixels PX, and the data line 171 may be disposed between the gate voltage supply line 127 and the pixel PX. The gate voltage supply line 127 may be disposed between two adjacent data lines 171.

Figure 2:
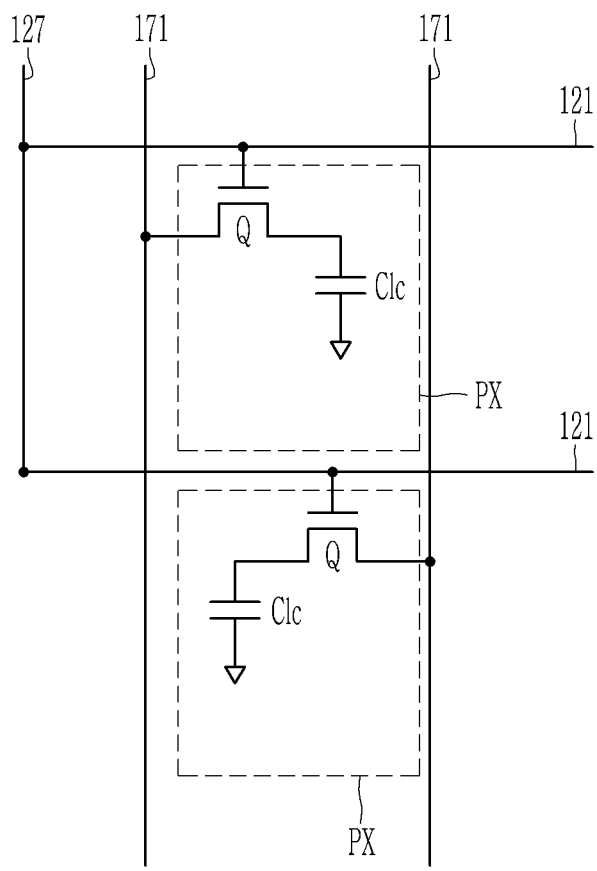
FIG. 2 illustrates an equivalent circuit diagram of two adjacent pixels of the display device of FIG. 1 according to an embodiment.

As shown in FIG. 2, each pixel PX includes a thin film transistor Q connected to the gate line 121 and the data line 171, and a liquid crystal capacitor Clc connected to the thin film transistor Q. A control terminal of the thin film transistor Q may be connected to the gate line 121, an input terminal of the thin film transistor Q may be connected to the data line 171, and an output terminal of the thin film transistor Q may be connected to the liquid crystal capacitor Clc. Although not illustrated, each pixel PX may further include a storage capacitor connected to the thin film transistor Q. Two adjacent gate lines 121 may be connected to the same gate voltage supply line 127.

When a gate-on voltage is applied to the gate voltage supply line 127, the gate-on voltage is transmitted to the two gate lines 121 connected to the gate voltage supply line 127, and all the thin film transistors Q connected to the two gate lines 121 are turned on. Accordingly, the data voltage transmitted through the data line 171 may be transmitted to each pixel PX through the turned-on thin film transistors Q to charge the liquid crystal capacitor Clc. In this case, the thin film transistors Q of two vertically adjacent pixels PX are turned on at the same time by receiving the same gate signal from the same gate voltage supply line 127. However, the thin film transistors Q of two vertically adjacent pixels PX receive different data voltages from different data lines 171, thus voltages charged in the capacitors Clc may be different.

The overall configuration of the display device according to the embodiment has been described above. Hereinafter, three adjacent pixels of a display device according to an embodiment will be further described with reference to FIG. 3 to FIG. 8.

Figure 3:
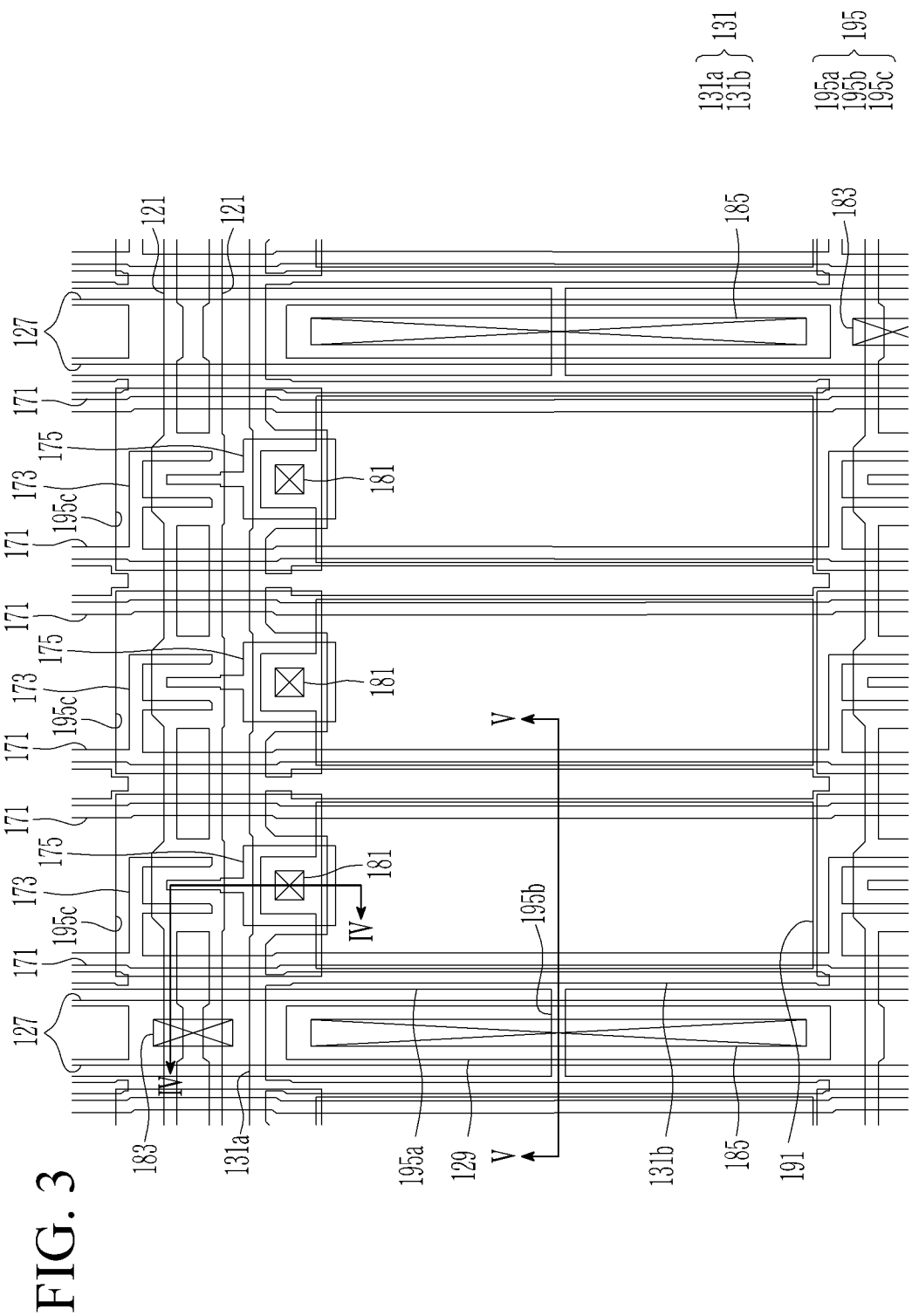
FIG. 3 illustrates a top plan view of a portion of a display device according to an embodiment.
Figure 4:
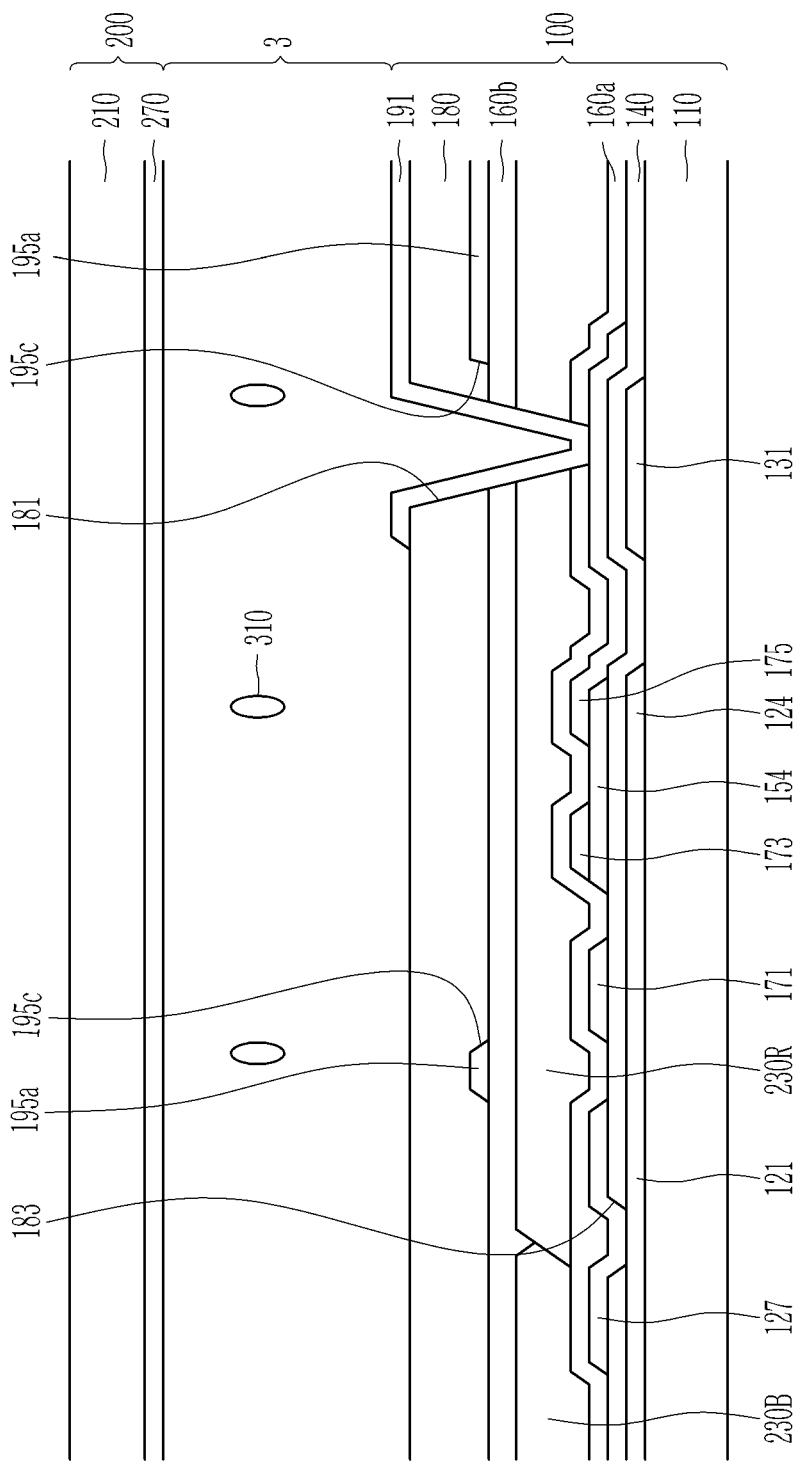
FIG. 4 illustrates a cross-sectional view taken along line IV-IV of FIG. 3.
Figure 5:
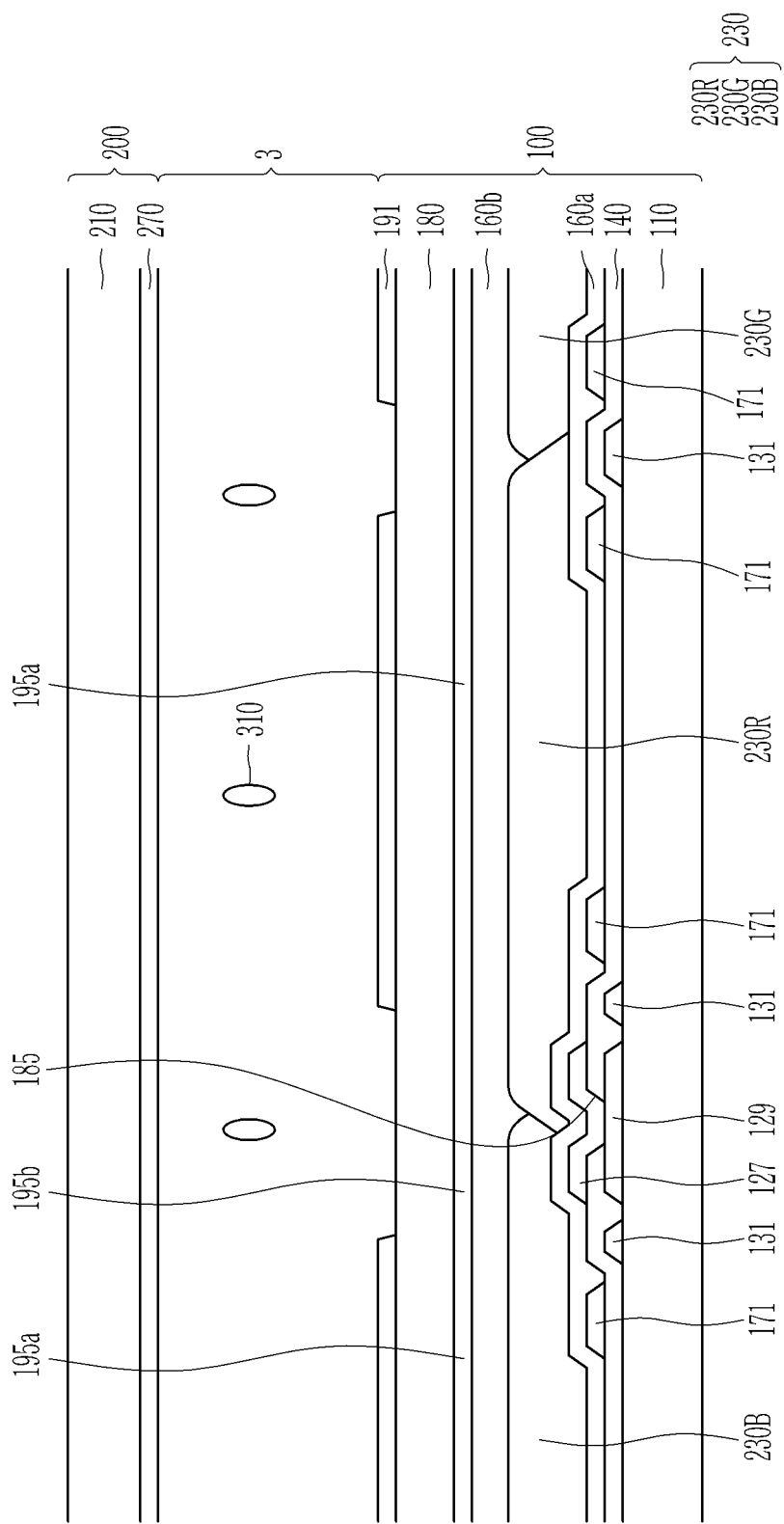
FIG. 5 illustrates a cross-sectional view taken along line V-V of FIG. 3.
Figure 6:
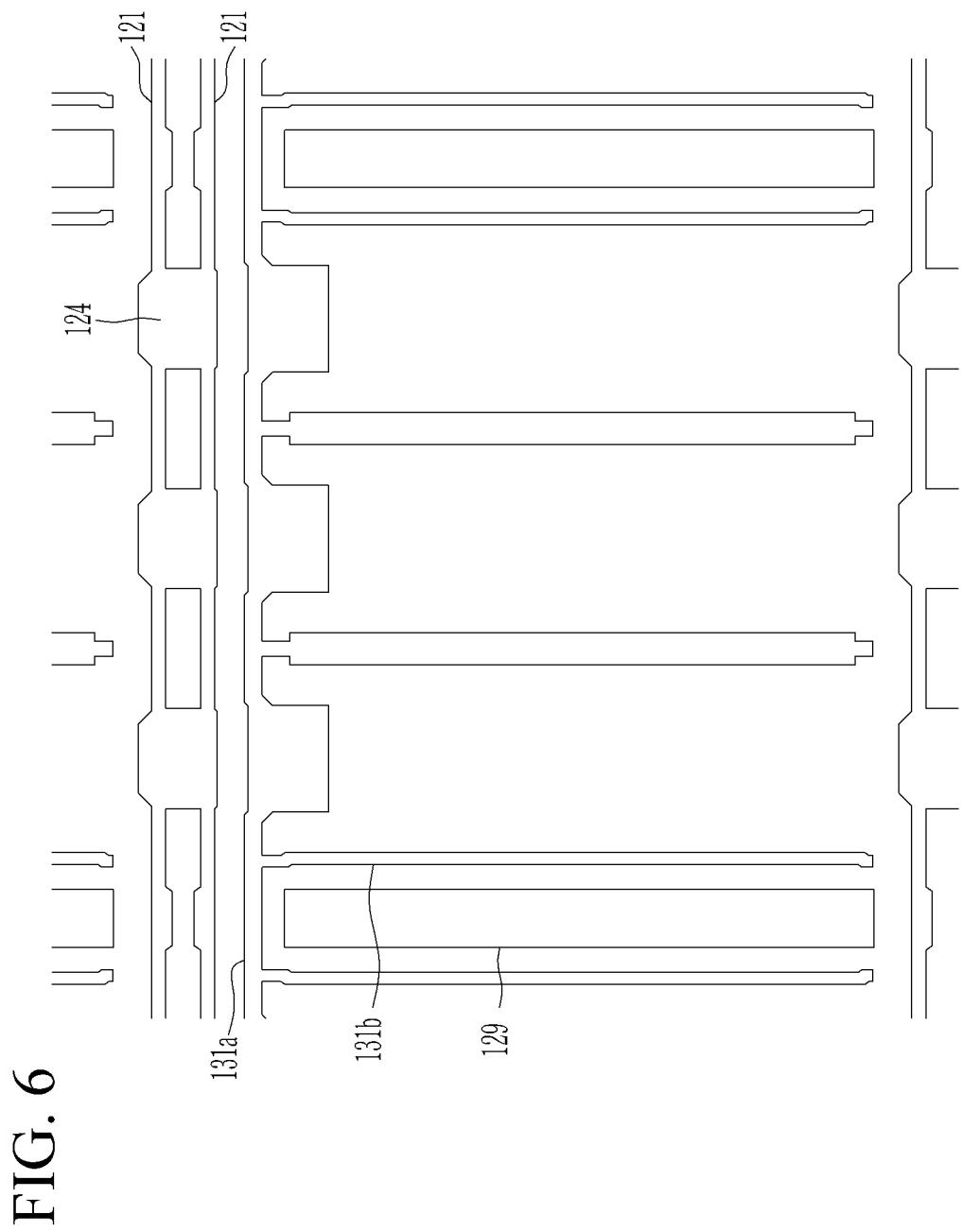
FIGS. 6, 7, and 8 illustrate sequential top plan views of a manufacturing order of a display device according to an embodiment.
Figure 7:
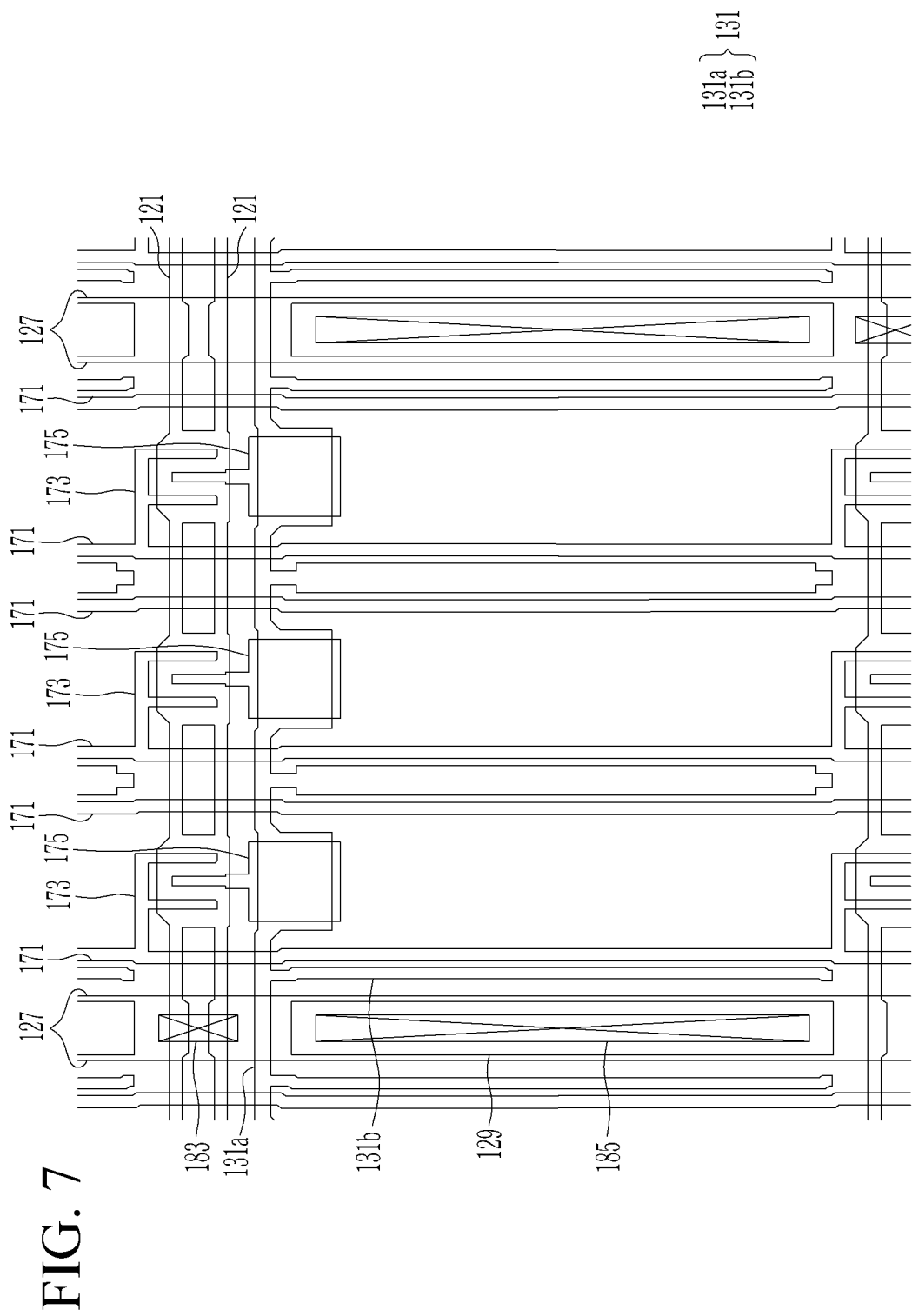
Figure 8:
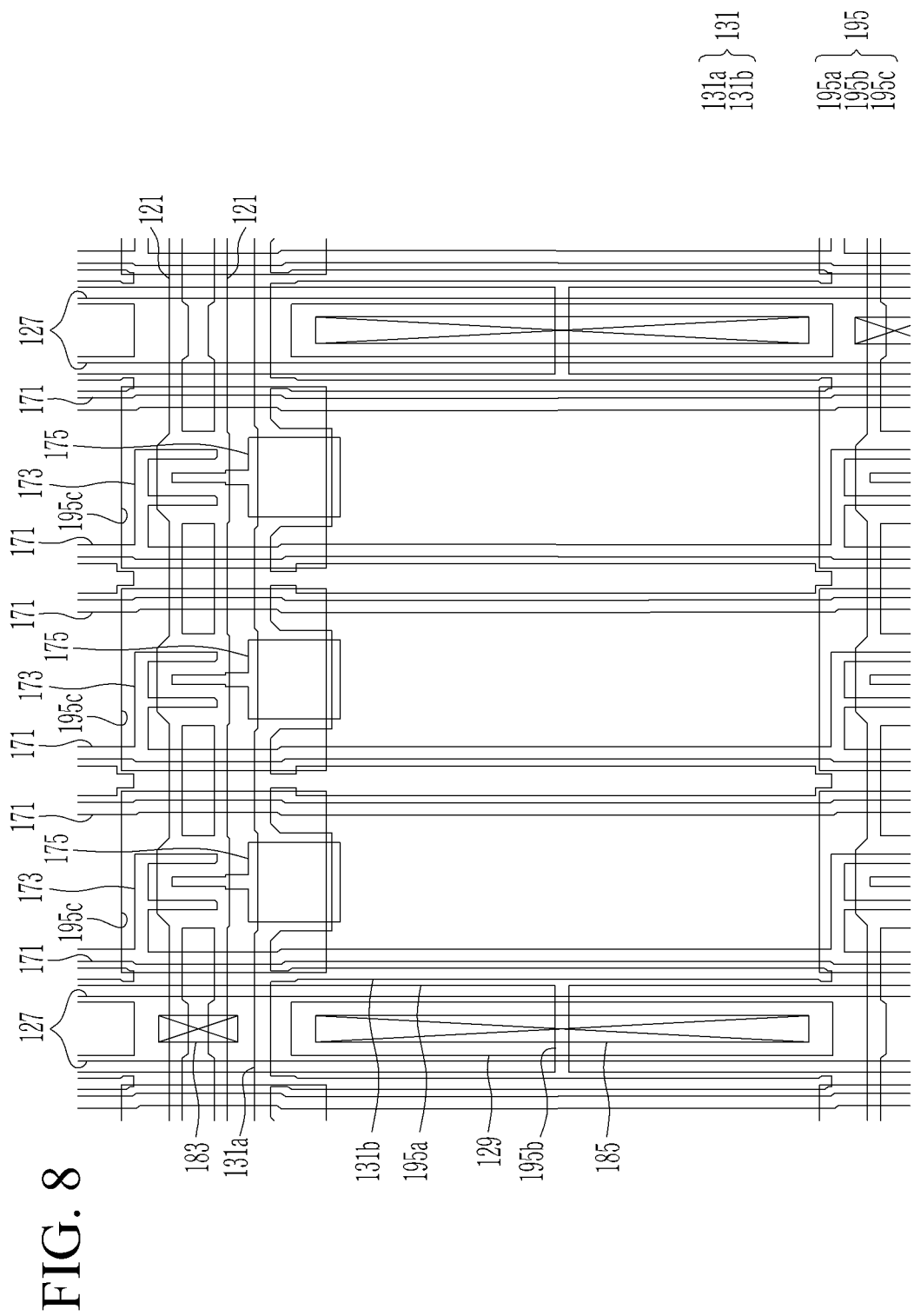

FIG. 3 illustrates a top plan view of a portion of a display device according to an embodiment. FIG. 4 illustrates a cross-sectional view taken along line IV-IV of FIG. 3. FIG. 5 illustrates a cross-sectional view taken along line V-V of FIG. 3. FIG. 6 to FIG. 8 illustrate sequential top plan views of a manufacturing order of a display device according to an embodiment. FIG. 3 to FIG. 8 illustrate three pixels adjacent in the row direction.

As shown in FIG. 3 to FIG. 8, a display device according to an embodiment includes a first display panel 100 and a second display panel 200 facing each other, and a liquid crystal layer 3 disposed between the first display panel 100 and the second display panel 200.

First, the first display panel 100 will be described.

A gate conductor including a gate line 121, a gate electrode 124, and a storage electrode line 131 may be disposed on a first substrate 110 made of a transparent insulating material such as glass or plastic. FIG. 6 illustrates the gate conductor. The gate conductor may include a low-resistance metal such as copper (Cu), molybdenum (Mo), aluminum (Al), silver (Ag), chromium (Cr), tantalum (Ta), and titanium (Ti), or a metal alloy thereof. The gate conductor may be made of a single layer or a multilayer.

The gate line 121 mainly extends in a row direction and transmits a gate signal. Unlike the illustrated embodiment, the gate line 121 may mainly extend in a column direction. The gate electrode 124 is integrally formed with the gate line 121, and protrudes from the gate line 121. It is to be understood that integrally formed herein means that they are formed of the same material in the same process and are connected to each other. The gate electrode 124 may receive a gate signal from the gate line 121. It is illustrated that a pair of gate lines 121 extend side by side and the gate electrode 124 is connected to the pair of gate lines 121. However, the gate electrode 124 can be connected to a single gate line 121. In the display device according to the embodiment, since a pair of gate lines 121 are connected to the gate electrode 124, even if one of the pair of gate lines 121 is cut and shorted during a repair process, a gate signal may be transmitted through the other gate line 121.

The storage electrode line 131 may include a first portion 131a and a second portion 131b. The first portion 131a of the storage electrode line 131 may be adjacent to the gate line 121, and it may extend in a row direction in parallel with the gate line 121 to be connected to a pixel PX adjacent to the first portion 131a. The first portion 131a of the storage electrode line 131 may have a portion having a wide width in a portion adjacent to the gate electrode 124, and the portion may overlap a drain electrode 175. The second portion 131b of the storage electrode line 131 may protrude from the first portion 131a. The second portion 131b of the storage electrode line 131 may mainly extend in the column direction parallel to a data line 171 to be disposed between adjacent pixels. However, the shape and position of the storage electrode line 131 may be variously changed. A constant voltage may be applied to the storage electrode line 131. The gate conductor may further include an auxiliary electrode 129. The auxiliary electrode 129 may mainly extend in the column direction parallel to the second portion 131b of the storage electrode line 131. The auxiliary electrode 129 may extend in a direction parallel to the data line 171. The auxiliary electrode 129 may be disposed between adjacent pixels. The auxiliary electrode 129 may be disposed between the second portion 131b of the adjacent storage electrode line 131. Three pixels may be disposed between adjacent auxiliary electrodes 129.

A gate insulating layer 140 may be disposed on the gate conductor. The gate insulating layer 140 may include an inorganic insulating material such as a silicon nitride (SiNx) and a silicon oxide (SiOx).

A semiconductor 154 may be disposed on the gate insulating layer 140. The semiconductor 154 may include a semiconductor material such as an amorphous silicon, a polycrystalline silicon, and a metal oxide. The semiconductor 154 may overlap the gate electrode 124.

A data conductor including the data line 171, a source electrode 173, a drain electrode 175, and a gate voltage supply line 127 may be disposed on the semiconductor 154. FIG. 7 illustrates the gate conductor and the data conductor together. The data conductor may include a low-resistance metal such as aluminum (Al), copper (Cu), silver (Ag), gold (Au), platinum (Pt), palladium (Pd), nickel (Ni), molybdenum (Mo), tungsten (W), titanium (Ti), chromium (Cr), and tantalum (Ta), or a metal alloy thereof. The data conductor may be made of a single layer or a multilayer.

The data line 171 mainly extends in the column direction and transmits a data voltage. Unlike the illustrated embodiment, the data line 171 may mainly extend in the row direction. The data line 171 may cross the gate line 121.

The source electrode 173 is integrally formed with the data line 171 and protrudes from the data line 171. Unlike the illustrated embodiment, a portion of the data line 171 may form the source electrode 173. The source electrode 173 may have a U-shaped bent shape. The drain electrode 175 is spaced apart from the source electrode 173 by a predetermined interval. One end of the drain electrode 175 may be surrounded by the source electrode 173. The other end of the drain electrode 175 may have a wide width, and may overlap the first portion 131a of the storage electrode line 131. The source electrode 173 and the drain electrode 175 may overlap the gate electrode 124. The source electrode 173 and the drain electrode 175 are spaced apart from each other on the gate electrode 124. Shapes of the source electrode 173 and the drain electrode 175 may be variously changed.

Although not illustrated, an ohmic contact layer may be further disposed between the semiconductor 154 and the source electrode 173 and between the semiconductor 154 and the drain electrode 175. The ohmic contact layer may be made of a material such as n+ hydrogenated amorphous silicon doped with a high concentration of silicide or n-type impurities.

The gate electrode 124, the source electrode 173, and the drain electrode 175 form a thin film transistor Q, e.g., see FIG. 2, together with the semiconductor 154. A channel of the thin film transistor Q may be formed on the semiconductor 154 between the source electrode 173 and the drain electrode 175.

The gate voltage supply line 127 may be disposed on the same layer as the data line 171. That is, the gate voltage supply line 127 may be formed of the same material as the data line 171 through the same process. The gate voltage supply line 127 may mainly extend in the column direction in parallel with the data line 171. The gate voltage supply line 127 may cross the gate line 121, and may overlap the gate line 121. An opening 183 overlapping the gate voltage supply line 127 and the gate line 121 may be formed in the gate insulating layer 140. The opening 183 of the gate insulating layer 140 may be disposed on and extend to the gate line 121. The gate voltage supply line 127 may be disposed in the opening 183 of the gate insulating layer 140 and on the gate insulating layer 140. Therefore, the gate voltage supply line 127 may be connected to the gate line 121 through the opening 183. The gate line 121 receives a gate signal from the gate voltage supply line 127 to apply it to the gate electrode 124 of the thin film transistor Q.

The gate voltage supply line 127 may extend parallel to the auxiliary electrode 129. The gate voltage supply line 127 may overlap the auxiliary electrode 129. An opening 185 overlapping the gate voltage supply line 127 and the auxiliary electrode 129 may be formed in the gate insulating layer 140. The opening 185 of the gate insulating layer 140 may be disposed on and extend to the auxiliary electrode 129. The gate voltage supply line 127 may be disposed in the opening 185 of the gate insulating layer 140 and on the gate insulating layer 140. Accordingly, the gate voltage supply line 127 may be connected to the auxiliary electrode 129 through the opening 185. Since the gate voltage supply line 127 is connected to the auxiliary electrode 129, resistance of the gate voltage supply line 127 may be reduced.

The gate voltage supply line 127 may be disposed between adjacent pixels. The gate voltage supply line 127 may be disposed between adjacent data lines 171. Three pixel columns may be disposed between adjacent gate voltage supply lines 127. Six data lines 171 may be disposed between adjacent gate voltage supply lines 127.

A first passivation layer 160a may be disposed on the data conductor. The first passivation layer 160a may include an inorganic insulating material. However, the first passivation layer 160a may include an organic insulating material.

A color filter 230 may be disposed on the first passivation layer 160a. The color filter 230 may uniquely display one of primary colors. The primary colors may include, for example, three primary colors of red, green, and blue. For example, the color filter 230 may include a first color filter 230R displaying a red color, a second color filter 230G displaying a green color, and a third color filter 230B displaying a blue color. However, the color displayed by the color filter 230 may have colors other than the three primary colors of red, green, and blue, for example, may be cyan, magenta, and yellow. The color filter 230 may display a mixed color of white or primary colors.

A second passivation layer 160b may be disposed on the color filter 230. The second passivation layer 160b may include an inorganic insulating material or an organic insulating material. The second passivation layer 160b may prevent the color filter 230 from being lifted, and prevent other layers from being contaminated by an organic material such as a solvent flowing from the color filter 230.

At least one of the first passivation layer 160a and the second passivation layer 160b may be omitted. In addition, the color filter 230 may be disposed on the second display panel 200 instead of the first display panel 100.

A shielding electrode 195 may be disposed on the second passivation layer 160b. FIG. 8 illustrates the gate conductor, the data conductor, and the shielding electrode 195 together. The shielding electrode 195 may be made of a transparent metal oxide such as an indium tin oxide (ITO) or an indium zinc oxide (IZO).

The shielding electrode 195 may include a main electrode portion 195a overlapping a pixel electrode 191, and a bridge portion 195b overlapping a region between adjacent pixel electrodes 191.

The main electrode portion 195a of the shielding electrode 195 mainly extends in the column direction along each pixel column. One main electrode portion 195a may overlap three pixel columns. That is, the main electrode portion 195a may be disposed to cover three pixel electrodes 191 adjacent to each other in the row direction and regions between these pixel electrodes 191. In this case, three pixel columns overlapping one main electrode portion 195a may be disposed between adjacent gate voltage supply lines 127. The main electrode portion 195a may also overlap the data line 171. One main electrode portion 195a may overlap six data lines 171. That is, the main electrode portion 195a may be disposed to cover six adjacent data lines 171 and regions between these data lines 171. In this case, the six data lines 171 overlapping one main electrode portion 195a may be disposed between adjacent gate voltage supply lines 127. The main electrode portion 195a may not overlap the gate voltage supply line 127.

The bridge portion 195b of the shielding electrode 195 is disposed between adjacent main electrode portions 195a, and extends from the main electrode portion 195a. That is, the bridge portion 195b may connect adjacent main electrode portions 195a. Accordingly, the main electrode portions 195a are entirely connected by the bridge portion 195b so that the same voltage may be applied to the main electrode portions 195a. A constant common voltage may be applied to the shielding electrode 195. The bridge portion 195b may overlap the gate voltage supply line 127. The bridge portion 195b may not overlap the pixel electrode 191. The bridge portion 195b may substantially extend in the row direction to cross the gate voltage supply line 127. In this case, a width of the bridge portion 195b may be narrower than a width of the gate voltage supply line 127. The bridge portion 195b may electrically connect the main electrode portions 195a, and may be formed to have a narrow width so as to minimize an overlapped region with the gate voltage supply line 127. In the display device according to the embodiment, by minimizing the overlapping region between the bridge portion 195b of the shielding electrode 195 and the gate voltage supply line 127, an RC delay of the gate voltage supply line 127 may be prevented.

The shielding electrode 195 may further include an opening 195c. The opening 195c is a region in which a portion of the main electrode portion 195a of the shielding electrode 195 is opened. The opening 195c may overlap the thin film transistor Q. That is, the opening 195c may be formed by removing a portion of the shielding electrode 195 overlapping the thin film transistor Q. The opening 195c may overlap most regions of the gate electrode 124, the source electrode 173, and the drain electrode 175. By forming the opening 195c in the shielding electrode 195, the region in which the shielding electrode 195 overlaps the thin film transistor Q is minimized, thus preventing electrical effects that may occur between the shielding electrode 195 and the thin film transistor Q.

An insulating layer 180 may be disposed on the shielding electrode 195. The insulating layer 180 may include an organic insulating material. The insulating layer 180 may also include a photosensitive material such as a photoresist.

The insulating layer 180 may include a pixel opening 181 overlapping the drain electrode 175. The pixel opening 181 may be further formed on the first passivation layer 160a, the color filter 230, and the second passivation layer 160b as well as the insulating layer 180. The pixel opening 181 may extend to and expose at least a portion of an upper surface of the drain electrode 175.

The pixel electrode 191 may be disposed on the insulating layer 180. The pixel electrode 191 may be made of a transparent metal oxide such as an indium tin oxide (ITO) or an indium zinc oxide (IZO). The pixel electrode 191 may be made of the same material as the shielding electrode 195, or may be made of a different material. The pixel electrode 191 may be disposed on a different layer from the shielding electrode 195, and may be formed by a different process.

The pixel electrode 191 may be approximately rectangular as a whole. The pixel electrode 191 may be formed to have a rectangle form including two sides parallel to the gate line 121 and two sides parallel to the data line 171. However, the overall shape of the pixel electrode 191 may be substantially rectangular, and the pixel electrode 191 may include a horizontal stem portion and a vertical stem portion, and fine branch portions extending from the horizontal stem portion and the vertical stem portion. The horizontal stem portion may substantially extend in a horizontal direction to be parallel to the gate line 121, and the vertical stem portion may substantially extend in a vertical direction to be parallel to the data line 171. The pixel electrode 191 may be divided into four sub-regions by the horizontal stem portion and the vertical stem portion. The fine branch portion may obliquely extend from the horizontal stem portion and the vertical stem portion, and the extending direction may form an angle of approximately 45 degrees or 135 degrees with the gate line 121 or the horizontal stem portion. In addition, the pixel electrode 191 may further include an outer stem portion connecting end portions of the fine branch portion.

The pixel electrode 191 may include a protrusion protruding from one side adjacent to the drain electrode 175, and the protrusion may overlap the drain electrode 175. The pixel electrode 191 may overlap the drain electrode 175 and the pixel opening 181. The pixel electrode 191 may be connected to the drain electrode 175 through the pixel opening 181. The pixel electrode 191 is applied with a data voltage from the data line 171 in a state in which the thin film transistor Q is turned on. The opening 195c of the shielding electrode 195 may overlap the pixel opening 181. The opening 195c of the shielding electrode 195 may be larger than the pixel opening 181. The opening 195c of the shielding electrode 195 may have a shape surrounding the pixel opening 181. The shielding electrode 195 is disposed on an upper layer of the drain electrode 175 and a lower layer of the pixel electrode 191. In this case, when the shielding electrode 195 overlaps a portion at which the drain electrode 175 and the pixel electrode 191 are connected, the shielding electrode 195 may be shorted to the drain electrode 175 or the pixel electrode 191. In the shielding electrode 195 of the display device according to the embodiment, since the opening 195c is formed at a portion overlapping the pixel opening 181 in which the drain electrode 175 and the pixel electrode 191 are connected to each other, it is possible to prevent the shielding electrode 195 from being shorted to an adjacent metal layer.

The pixel electrode 191 may overlap the shielding electrode 195. Most of the pixel electrode 191 may overlap the shield electrode 195. Except for a portion connected to the drain electrode 175, most of the remainder of the pixel electrode 191 may overlap the shielding electrode 195. The pixel electrode 191 may overlap the data line 171. The shielding electrode 195 may be disposed between the pixel electrode 191 and the data line 171. The data line 171 may be disposed on a lower layer of the shielding electrode 195, and the pixel electrode 191 may be disposed on an upper layer of the shielding electrode 195. One pixel electrode 191 may overlap two data lines 171. A left edge portion of the pixel electrode 191 may overlap one of the two data lines 171, and a right edge portion of the pixel electrode 191 may overlap the other of the two data lines 171.

One pixel electrode 191 may be adjacent to three or four data lines 171. For example, referring to a middle pixel of the three pixels illustrated in FIG. 3, the pixel electrode 191 may be adjacent to the four data lines 171. Two data lines 171 overlapping the pixel electrode 191 and two data lines adjacent to the two data lines 171 overlapping the pixel electrode 191 may be adjacent to the pixel electrode 191. In this case, a data voltage of a positive polarity may be applied to two of the four data lines 171, and a data voltage of a negative polarity may be applied to the other two data lines 171. Even if the shielding electrode 195 is not disposed between the data line 171 and the pixel electrode 191, since a capacitance formed between the data line 171 to which the data voltage of the positive polarity is applied and the pixel electrode 191 and a capacitance formed between the data line 171 to which the data voltage of the negative polarity is applied and the pixel electrode 191 are similar, vertical crosstalk may not occur.

For example, referring to a left pixel of the three pixels illustrated in FIG. 3, the pixel electrode 191 may be adjacent to three data lines 171. Two data lines 171 overlapping the pixel electrode 191 and one data line 171 disposed in the corresponding pixel and in the pixel adjacent to a right side thereof may be adjacent to each other. Since the gate voltage supply line 127 is disposed between the corresponding pixel and the data line 171 disposed in the pixel adjacent to a left side of the corresponding pixel, there is little electrical influence. In this case, a data voltage of a positive polarity may be applied to two of the three data lines 171, and a data voltage of a negative polarity may be applied to the other data line 171. Alternatively, a data voltage of a negative polarity may be applied to two of the three data lines 171, and a data voltage of a positive polarity may be applied to the other data line 171. Accordingly, when the shielding electrode 195 is not disposed between the data line 171 and the pixel electrode 191, due to a difference between a capacitance formed between the data line 171 to which the data voltage of the positive polarity is applied and the pixel electrode 191 and a capacitance formed between the data line 171 to which the data voltage of the negative polarity is applied and the pixel electrode 191, vertical crosstalk may occur. In the display device according to the embodiment, since the shielding electrode 195 is disposed between the data line 171 and the pixel electrode 191, the electrical influence between the data line 171 and the pixel electrode 191 may be shielded to prevent vertical crosstalk from occurring.

Referring to a right pixel of the three pixels illustrated in FIG. 3, the pixel electrode 191 may be adjacent to three data lines 171. Two data lines 171 overlapping the pixel electrode 191 and one data line 171 disposed in the corresponding pixel and in the pixel adjacent to a left side thereof may be adjacent to each other. In this case, a polarity of the data voltage applied to the two data lines 171 among the three data lines 171 may be different from that of the data voltage applied to the other data line 171. In the display device according to the embodiment, since the shielding electrode 195 is disposed between the data line 171 and the pixel electrode 191, the electrical influence between the data line 171 and the pixel electrode 191 may be shielded to prevent vertical crosstalk from occurring.

The shielding electrode 195 is adjacent to the gate voltage supply line 127, and is disposed on an upper layer of the gate voltage supply line 127. The shielding electrode 195 overlaps the pixel electrode 191, and is disposed on a lower layer of the pixel electrode 191. Therefore, the shielding electrode 195 may be disposed between the gate voltage supply line 127 and the pixel electrode 191. When a gate-on voltage is applied to the gate voltage supply line 127, the gate-on voltage is transmitted to the gate line 121 connected to the gate voltage supply line 127, and a data voltage is applied to the pixel electrode 191 of the pixels connected to the corresponding gate line 121. In this case, a parasitic capacitance may be formed between the pixel electrode 191 to which the data voltage is applied and the gate voltage supply line 127 to which the gate-on voltage is applied, and a kickback voltage may increase. In the display device according to the embodiment, since the shielding electrode 195 is disposed between the gate voltage supply line 127 and the pixel electrode 191, the electrical influence between the gate voltage supply line 127 and the pixel electrode 191 may be shielded to prevent the kickback voltage from increasing.

Hereinafter, the second display panel 200 will be described.

A common electrode 270 is disposed on a second substrate 210 made of a transparent insulating material such as glass or plastic. The common electrode 270 may be made of a transparent metal oxide such as an indium tin oxide (ITO) or an indium zinc oxide (IZO). The common electrode 270 may be formed as a single plate over the pixels PX or substantially over the entire second display panel 200. However, a slit or an opening may be formed in the common electrode 270.

A constant common voltage may be applied to the common electrode 270. The same common voltage may be applied to the shielding electrode 195 and the common electrode 270.

Although not illustrated, a light blocking member may be further disposed between the second substrate 210 and the common electrode 270. The light blocking member may overlap an edge of the pixel electrode 191, the thin film transistor Q, the gate line 121, the gate voltage supply line 127, and the data line 171. The light blocking member is also called a black matrix, and may serve to prevent light leakage.

Although not illustrated, an overcoat may be further disposed between the light blocking member and the common electrode 270. The overcoat flattens constituent elements disposed under the overcoat and suppresses contamination of the liquid crystal layer 3 by an organic material flowing from the constituent elements disposed under the overcoat, thus preventing defects such as afterimages that may occur when a screen is driven.

Alignment films (not shown) may be disposed on inner surfaces of the first display panel 100 and the second display panel 200, and these may be vertical alignment films.

Polarizers (not shown) may be disposed on outer surfaces of the two display panels 100 and 200, and transmissive axes of the two polarizers may be orthogonal, and one transmissive axis may be parallel to the gate line 121. However, the polarizer may be disposed only on the outer surface of one of the two display panels 100 and 200.

The liquid crystal layer 3 has negative dielectric anisotropy, and liquid crystal molecules 310 of the liquid crystal layer 3 are aligned such that their long axes are perpendicular to the surfaces of the two display panels 100 and 200 in the absence of an electric field. Therefore, in the absence of the electric field, incident light does not pass through an orthogonal polarizer and is blocked.

At least one of the liquid crystal layer 3 and the alignment film may include a photo-reactive material, more specifically, a reactive mesogen.

Although the case in which the liquid crystal molecules 310 are initially vertically aligned is described above, in an embodiment, the liquid crystal molecules 310 may be horizontally aligned, and the alignment film may be formed as a horizontal alignment film. The common electrode 270 may be disposed on the first display panel 100 instead of the second display panel 200. In the above, the case in which the common electrode 270 is disposed above the liquid crystal layer 3 has been described, but the common electrode 270 may be disposed below the liquid crystal layer 3.

In the above, the pixel disposed around the portion in which the gate voltage supply line 127 and the gate line 121 of the display device according to the embodiment are connected has been described. Hereinafter, a pixel disposed around a portion in which the gate voltage supply line 127 and the gate line 121 of the display device according to the embodiment cross but are not connected will be described with reference to FIG. 9.

Figure 9:
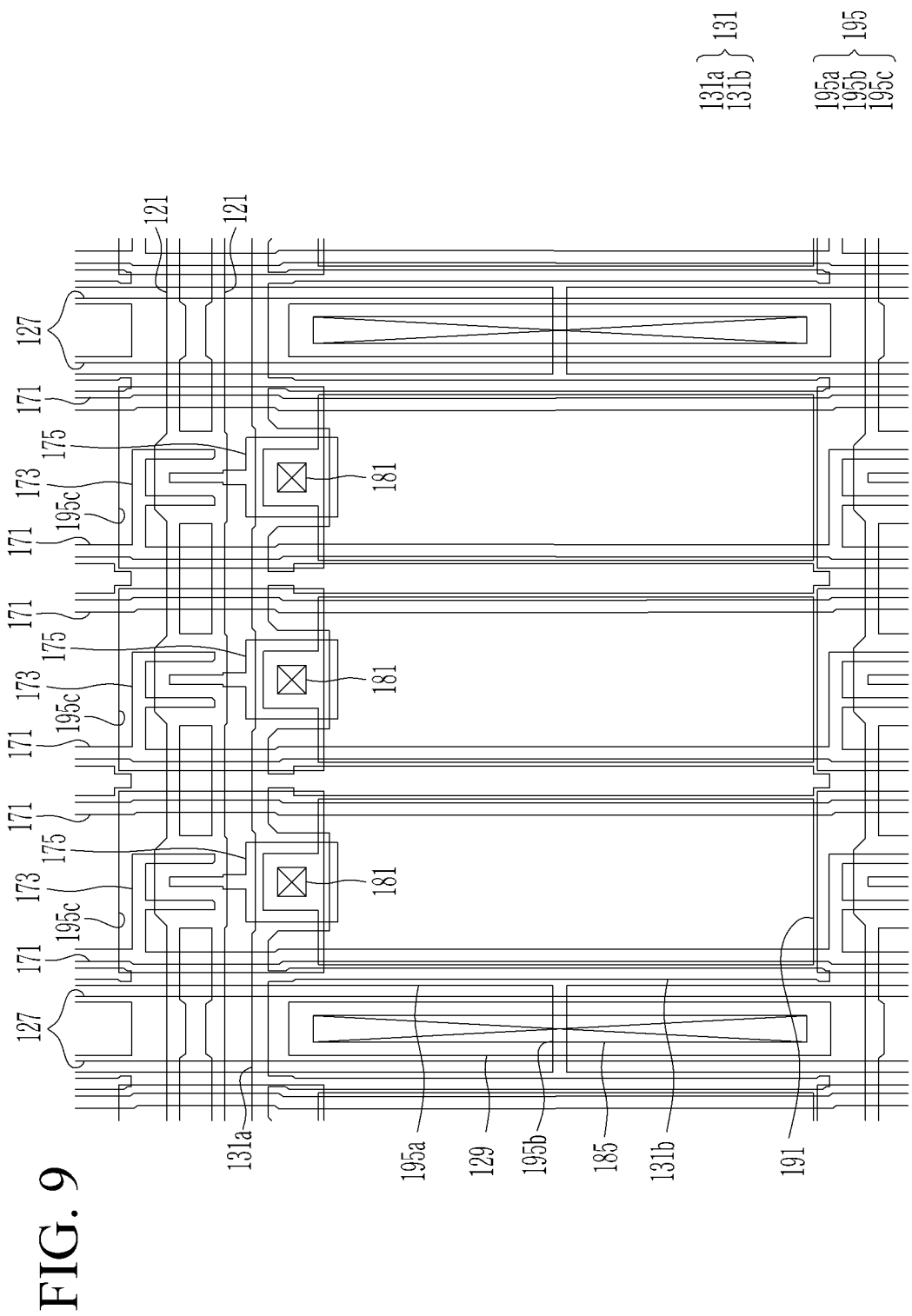
FIG. 9 illustrates a top plan view of a portion of a display device according to an embodiment.

FIG. 9 illustrates a top plan view of a portion of a display device according to an embodiment.

As shown in FIG. 9, the display device according to the embodiment includes a gate line 121 and a data line 171 crossing each other, a thin film transistor Q connected to them, and a pixel electrode 191 connected to the thin film transistor Q. The display device according to the embodiment further includes a gate voltage supply line 127 crossing the gate line 121 and extending in a direction parallel to the data line 171. The display device according to the embodiment further includes a shielding electrode 195 overlapping the data line 171 and the pixel electrode 191 and being adjacent to the gate voltage supply line 127.

FIG. 9 illustrates a portion in which the gate voltage supply line 127 is not connected to the gate line 121. When a gate-on voltage is applied to the gate line 121, a data voltage may be applied to the pixel electrode 191 of the pixels connected to the corresponding gate line 121, and a gate-off voltage may be applied to the gate voltage supply line 127 not connected to the gate line 121. In this case, a parasitic capacitance may be formed between the pixel electrode 191 to which the data voltage is applied and the gate voltage supply line 127 to which the gate-off voltage is applied, and a kickback voltage may be reduced. In the display device according to the embodiment, since the shielding electrode 195 is disposed between the gate voltage supply line 127 and the pixel electrode 191, the electrical influence between the gate voltage supply line 127 and the pixel electrode 191 may be shielded to prevent the kickback voltage from being reduced.

As described above, the display device according to the embodiment may be formed as a liquid crystal display device. However, the display device according to the embodiment may be formed as an organic light emitting diode display device, an electrophoretic display device, or an electrowetting display device. In addition, the display device according to the embodiment may be formed as a next-generation display device such as a micro LED display device, a quantum dot light emitting diode (QLED) display device, or a quantum dot organic light emitting diode (QD-OLED) display device.

Hereinafter, a display device according to an embodiment will be described with reference to FIG. 10.

Figure 10:
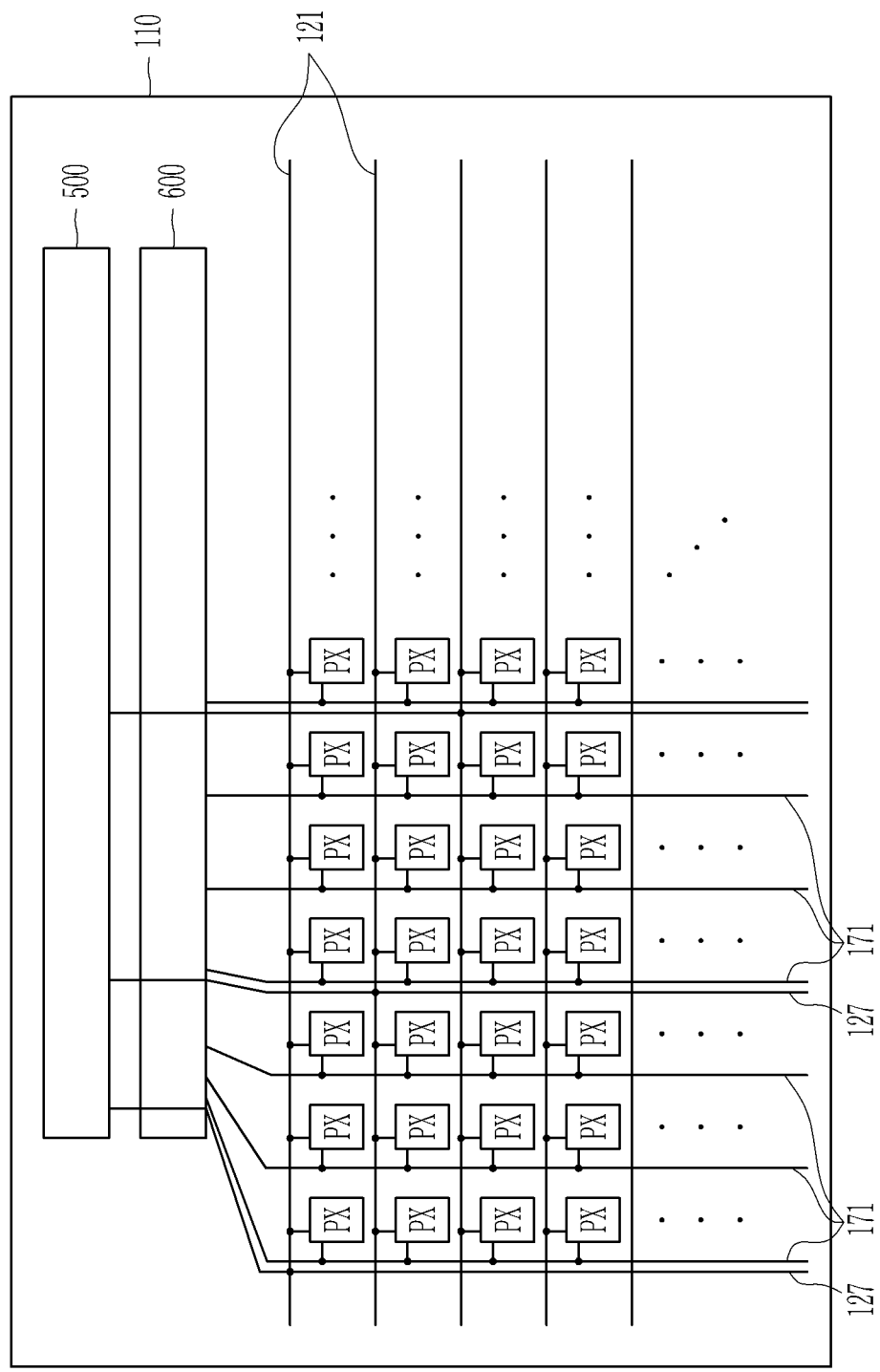
FIG. 10 illustrates a layout diagram of a display device according to an embodiment.

Since many portions of the display device according to the embodiment of FIG. 10 are the same as those of the display device according to the embodiment of FIG. 1 to FIG. 9, a repeated description of the portions will be omitted. The present embodiment is different from the previous embodiment in that one gate voltage supply line 127 is connected to one gate line 121, and one data line 171 is disposed between two adjacent pixels PX in the row direction, which will be further described below.

FIG. 10 illustrates a layout diagram of a display device according to an embodiment.

As shown in FIG. 10, the display device according to the embodiment includes the first substrate 110, and the gate line 121, the gate voltage supply line 127, the data line 171, and the pixel PX connected to the gate line 121 and the data line 171 that are disposed on the first substrate 110.

In the previous embodiment, one gate voltage supply line 127 is connected to two gate lines 121, while in the present embodiment, one gate voltage supply line 127 is connected to one gate line 121. In the previous embodiment, the same gate signal is applied to the two gate lines 121 connected to the same gate voltage supply line 127. In the present embodiment, since respective gate lines 121 are connected to different gate voltage supply lines 127, different gate signals are respectively applied to the gate lines 121.

In the previous embodiment, two data lines 171 are disposed between two adjacent pixels PX in the row direction, while in the present embodiment, one data line 171 is disposed between two adjacent pixels PX in the row direction. In the previous embodiment, pixels PX included in one pixel column are alternately connected to two data lines 171. That is, two pixels PX to which the same gate signal is applied among the pixels PX included in one pixel column are connected to different data lines 171. In the present embodiment, the pixels PX included in one pixel column are connected to the same data line 171.

However, the connection relationship between the pixel PX and the gate line 121 and the data line 171 may be variously changed. For example, one data line 171 may be disposed between two adjacent pixels PX in the row direction, and the pixels PX included in one pixel column may be alternately connected to the data lines 171 disposed at both sides of the corresponding pixel column.

In the previous and present embodiments, since the shielding electrode 195 is disposed between the data line 171 and the pixel electrode 191, the electrical influence between the data line 171 and the pixel electrode 191 may be prevented. In addition, since the shielding electrode 195 is disposed between the gate voltage supply line 127 and the pixel electrode 191, the electrical influence between the gate voltage supply line 127 and the pixel electrode 191 may be prevented.

Hereinafter, a display device according to an embodiment will be described with reference to FIG. 11 to FIG. 13.

Figure 11:
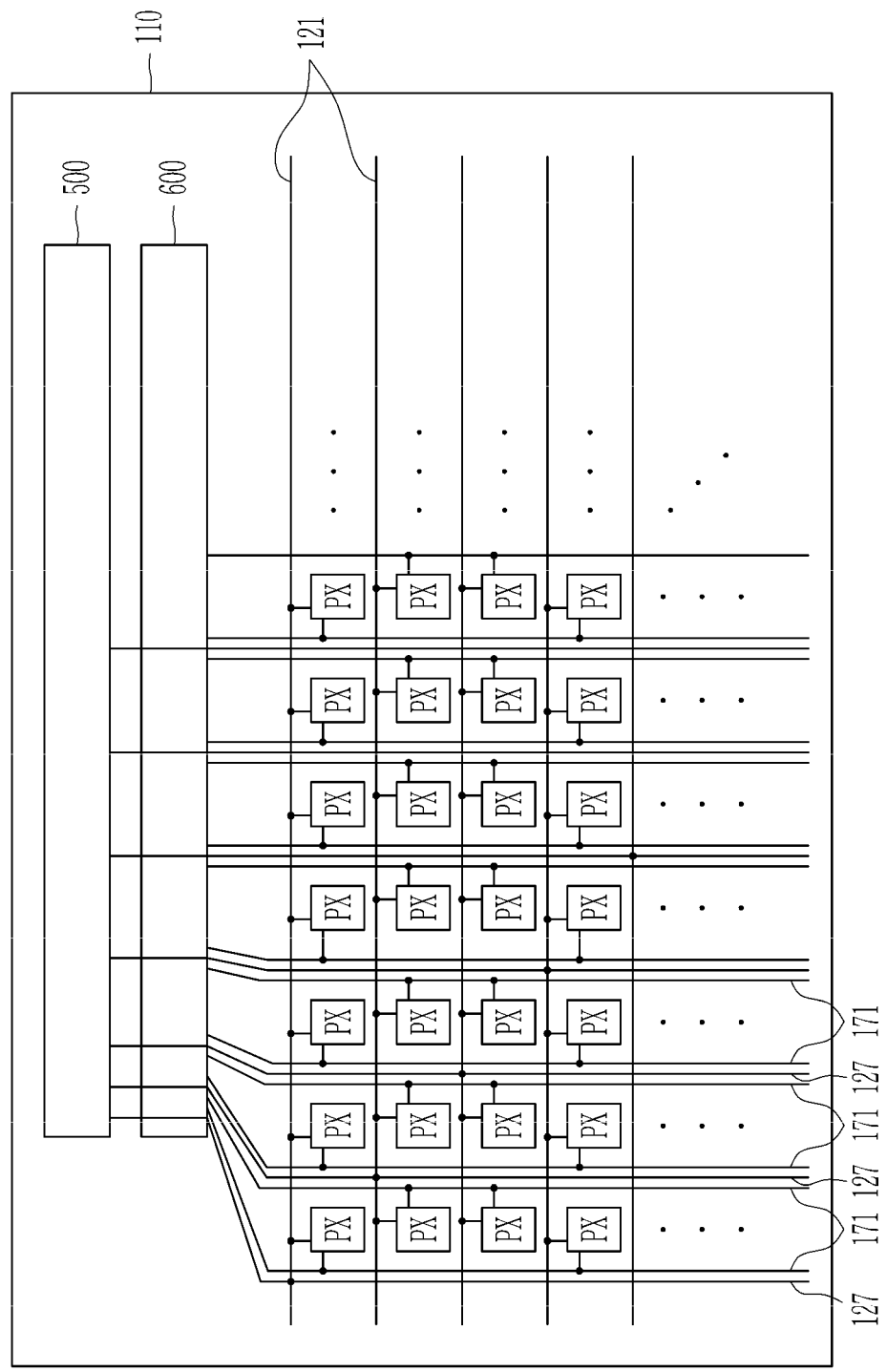
FIG. 11 illustrates a layout diagram of a display device according to an embodiment.
Figure 12:
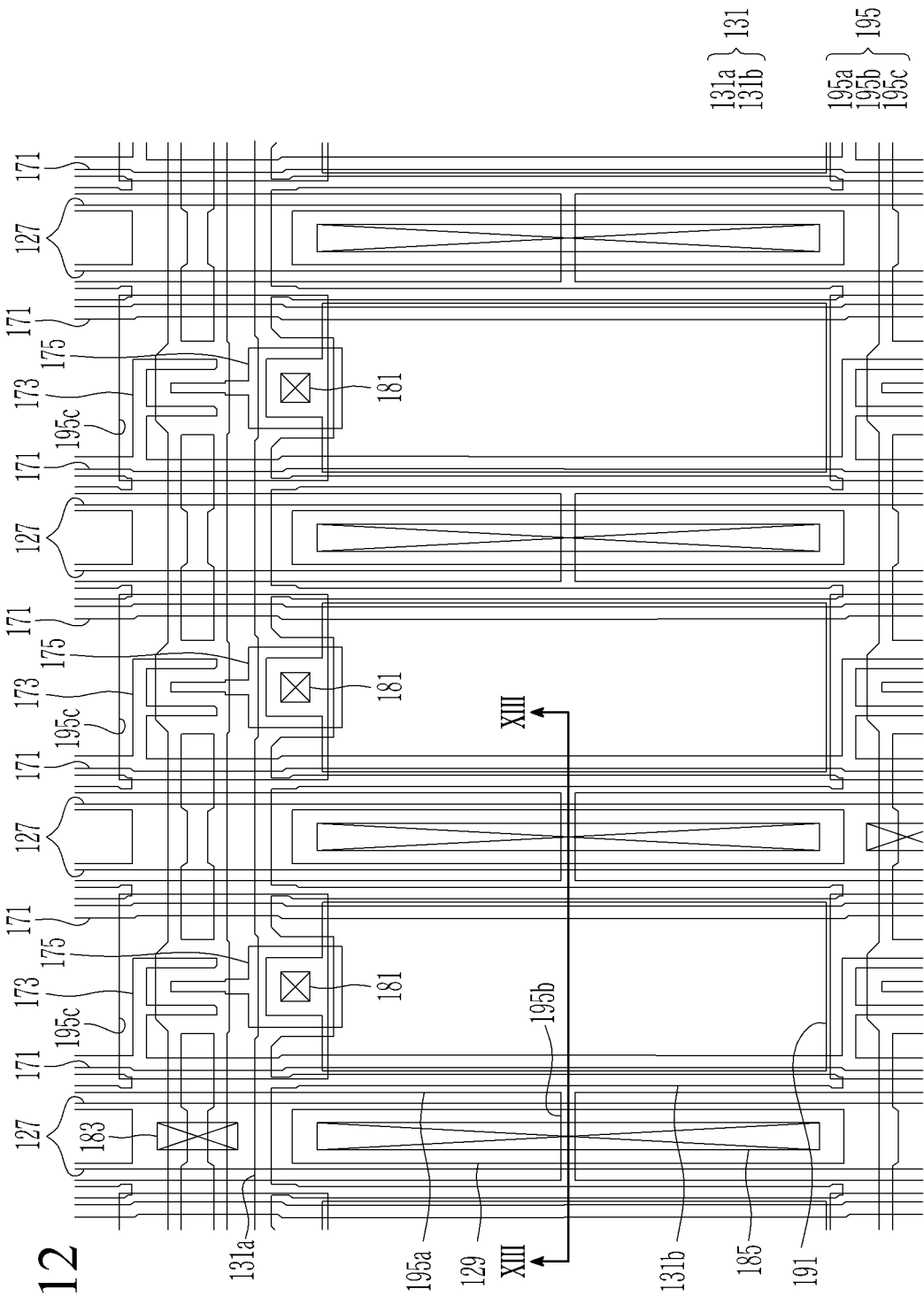
FIG. 12 illustrates a top plan view of a portion of the display device of FIG. 11 according to an embodiment.
Figure 13:
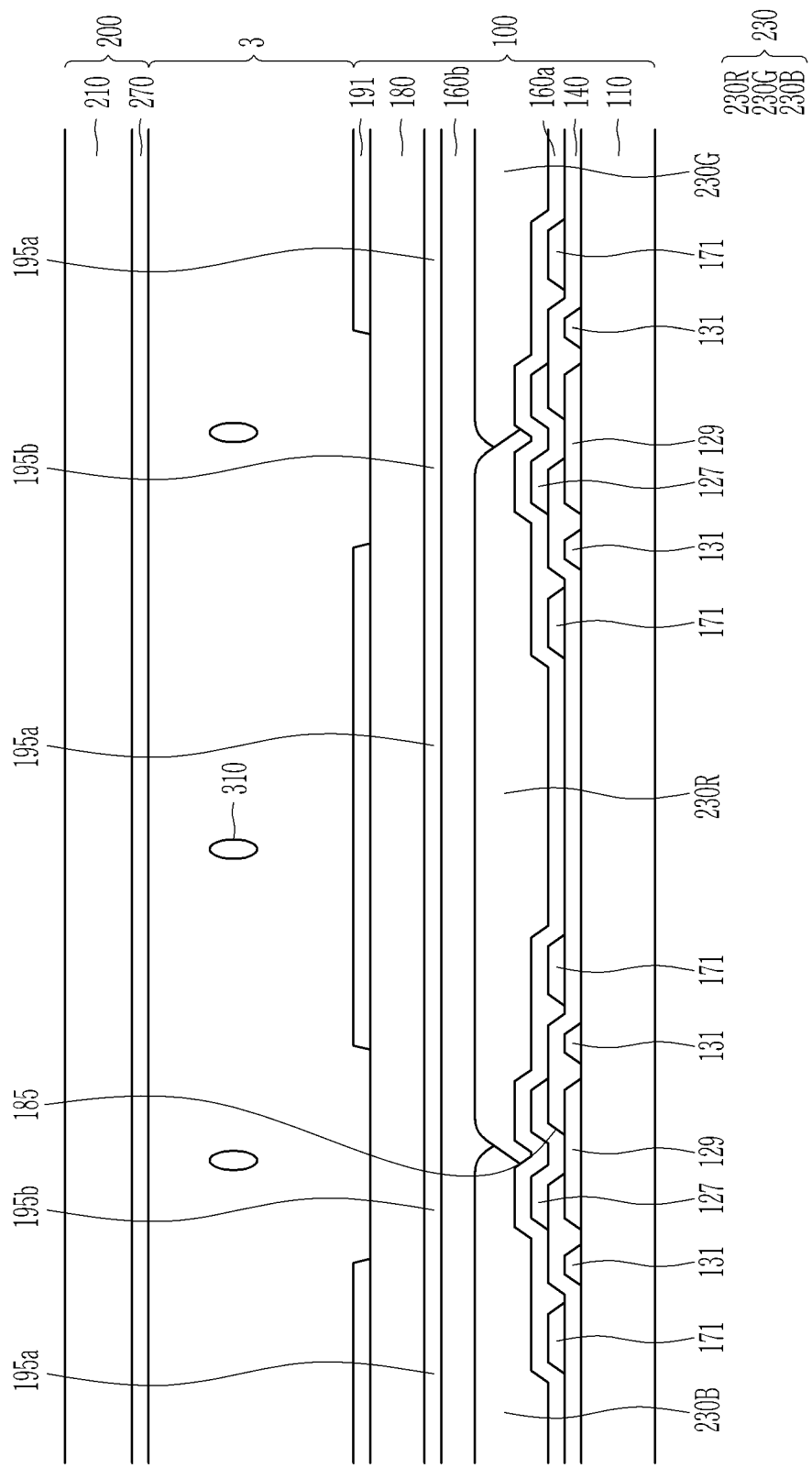
FIG. 13 illustrates a cross-sectional view taken along line XIII-XIII of FIG. 12.

Since many portions of the display device according to the embodiment of FIG. 11 to FIG. 13 are the same as those of the display device according to the embodiment of FIG. 1 to FIG. 9, a repeated description of the portions will be omitted. The present embodiment differs from the previous embodiment in that one pixel column is disposed between adjacent gate voltage supply lines 127, which will be further described below.

FIG. 11 illustrates a layout diagram of a display device according to an embodiment. FIG. 12 illustrates a top plan view of a portion of the display device of FIG. 11 according to an embodiment. FIG. 13 illustrates a cross-sectional view taken along line XIII-XIII of FIG. 12.

As shown in FIG. 11 to FIG. 13, the display device according to the embodiment includes the first substrate 110, and the gate line 121, the gate voltage supply line 127, the data line 171, and the pixel PX connected to the gate line 121 and the data line 171 that are disposed on the first substrate 110.

In the previous embodiment, three pixel columns are disposed between adjacent gate voltage supply lines 127, while in the present embodiment, one pixel column is disposed between adjacent gate voltage supply lines 127. Therefore, in the present embodiment, the gate voltage supply lines 127 are disposed at both sides of each pixel PX. That is, a gate voltage supply line 127 may be disposed at the left side of each pixel PX, and a gate voltage supply line 127 may be disposed at the right side of each pixel PX. The gate voltage supply line 127 may be disposed between two adjacent pixels PX, and the data line 171 may be disposed between the gate voltage supply line 127 and the pixel PX. The gate voltage supply line 127 may be disposed between two adjacent data lines 171. Some of the pixels PX included in one pixel column may be connected to the data line 171 disposed at the left side of the pixel column, and the remainder of the pixels PX included in the pixel column may be connected to the data line 171 disposed at the right side of the pixel column. Data voltages of different polarities may be applied to two data lines 171 connected to one pixel column.

In the previous embodiment, each main electrode portion 195a of the shielding electrode 195 overlaps the three pixel electrodes 191, while in the present embodiment, each main electrode portion 195a of the shielding electrode 195 overlaps one pixel electrode 191. In the previous embodiment, each main electrode portion 195a of the shielding electrode 195 overlaps the six data lines 171, while in the present embodiment, each main electrode portion 195a of the shielding electrode 195 overlaps two data lines 171.

In the present embodiment, the number of gate voltage supply lines 127 may be greater than that in the previous embodiment. Some gate voltage supply lines 127 may not be connected to the gate line 121.

In the previous and present embodiments, since the shielding electrode 195 is disposed between the data line 171 and the pixel electrode 191, the electrical influence between the data line 171 and the pixel electrode 191 may be prevented. In addition, since the shielding electrode 195 is disposed between the gate voltage supply line 127 and the pixel electrode 191, the electrical influence between the gate voltage supply line 127 and the pixel electrode 191 may be prevented.

Hereinafter, a display device according to an embodiment will be described with reference to FIG. 14 and FIG. 15.

Figure 14:
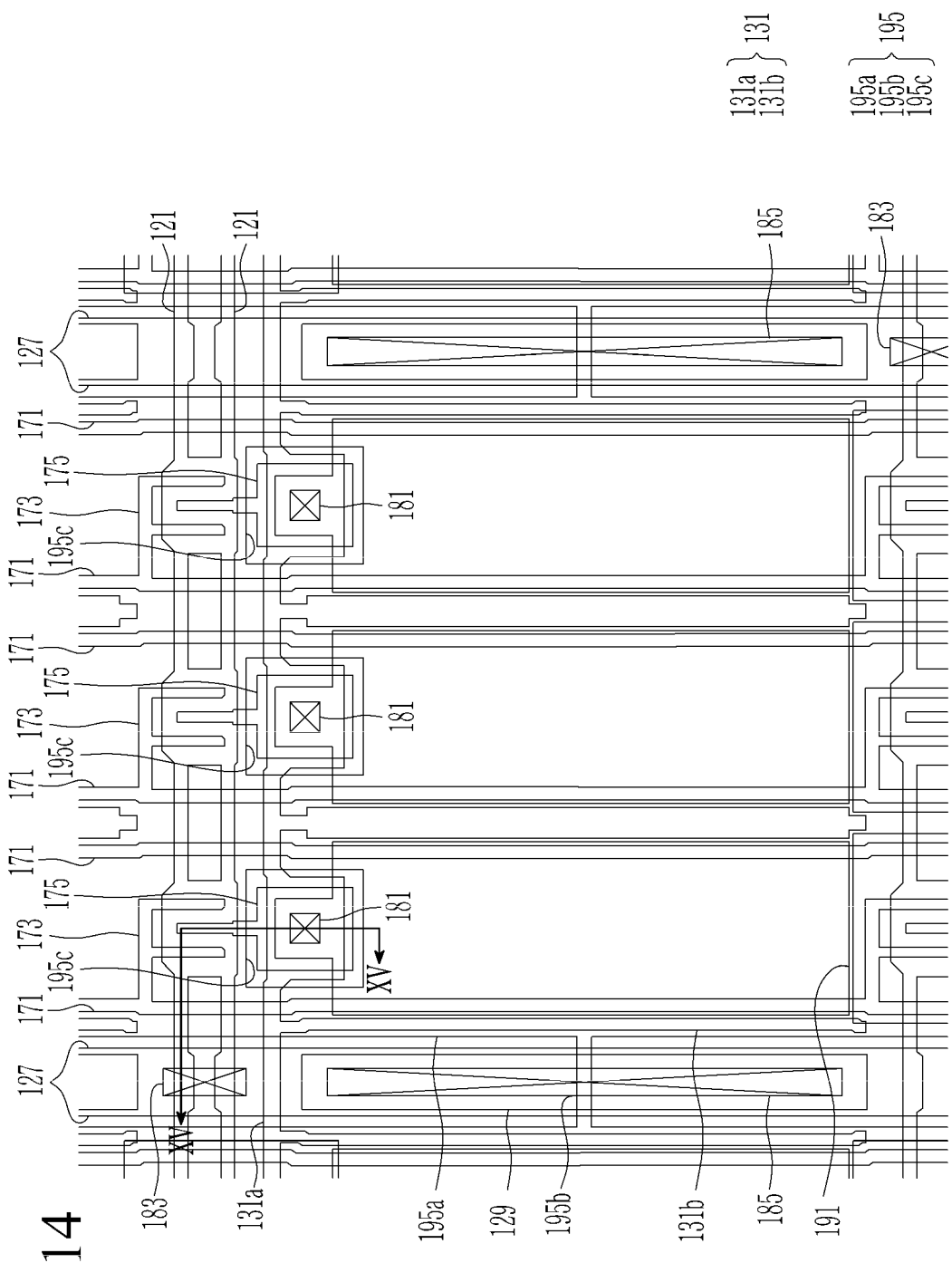
FIG. 14 illustrates a top plan view of a portion of a display device according to an embodiment.
Figure 15:
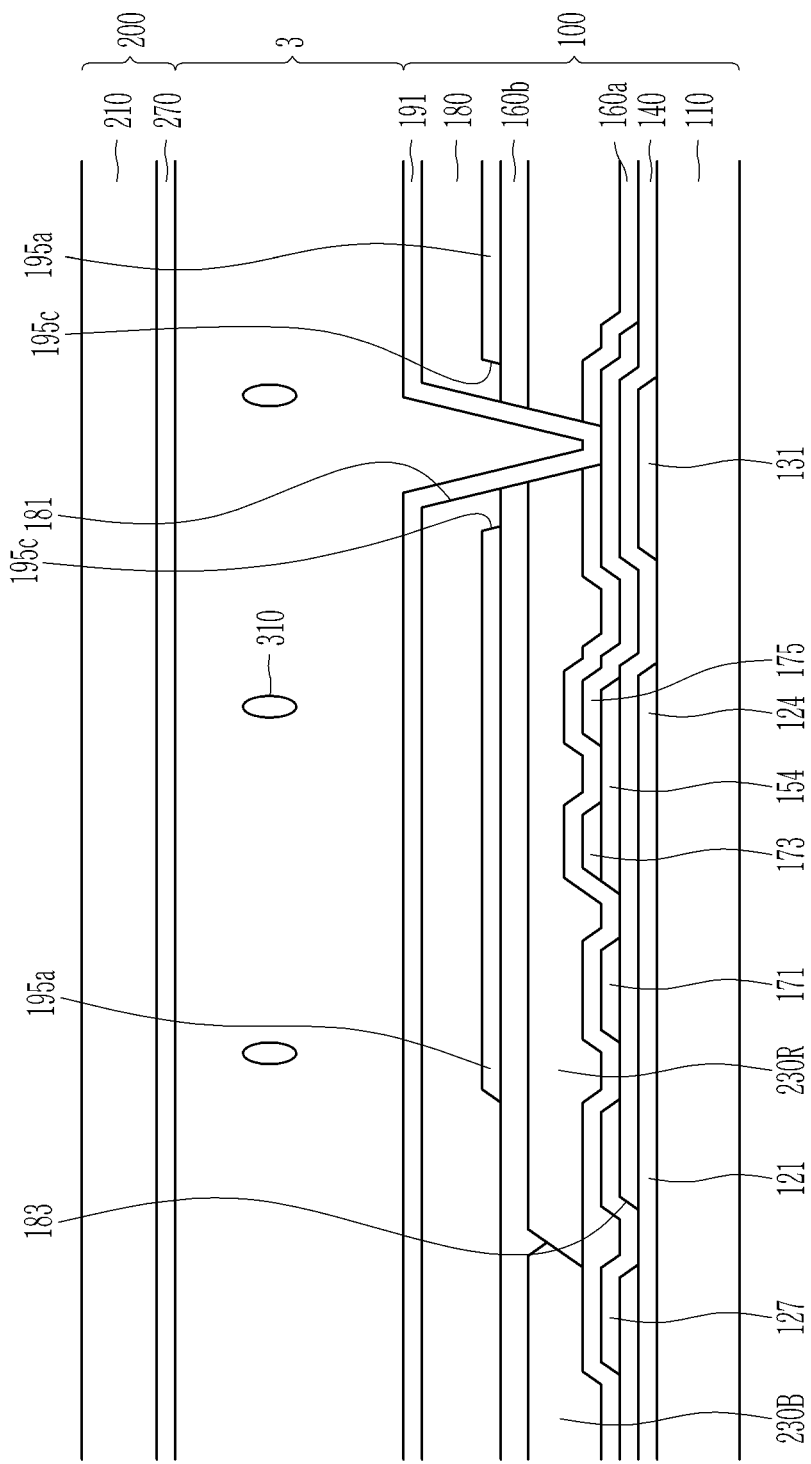
FIG. 15 illustrates a cross-sectional view taken along line XV-XV of FIG. 14.

Since many portions of the display device according to the embodiment of FIG. 14 and FIG. 15 are the same as those of the display device according to the embodiment of FIG. 1 to FIG. 9, a repeated description of the portions will be omitted. The present embodiment differs from the previous embodiment in that the shielding electrode overlaps the gate electrode and the source electrode of the thin film transistor, which will be further described below.

FIG. 14 illustrates a top plan view of a portion of a display device according to an embodiment. FIG. 15 illustrates a cross-sectional view taken along line XV-XV of FIG. 14.

The display device according to the embodiment includes the first substrate 110, and the gate line 121, the gate voltage supply line 127, the data line 171, the thin film transistor Q, the shielding electrode 195, and the pixel electrode 191 that are disposed on the first substrate 110.

The opening 195c may be formed in the shielding electrode 195, and the pixel opening 181 may be formed in the insulating layer 180 disposed between the shielding electrode 195 and the pixel electrode 191. The opening 195c of the shielding electrode 195 may overlap the pixel opening 181. The opening 195c of the shielding electrode 195 may be larger than the pixel opening 181. The opening 195c of the shielding electrode 195 may have a shape surrounding the pixel opening 181.

In the previous embodiment, the opening 195c of the shielding electrode 195 overlaps most areas of the thin film transistor Q, while in the present embodiment, the opening 195c of the shielding electrode 195 overlaps only some areas of the thin film transistor Q. In the present embodiment, the opening 195c of the shielding electrode 195 may overlap a portion in which the drain electrode 175 and the pixel electrode 191 of the thin film transistor Q are connected and a periphery portion of the portion in which the drain electrode 175 and the pixel electrode 191 of the thin film transistor Q are connected, but may not overlap the remainder excluding the portions. That is, the shielding electrode 195 may overlap the gate electrode 124 and the source electrode 173 of the thin film transistor Q.

In the previous and present embodiments, since the shielding electrode 195 is disposed between the data line 171 and the pixel electrode 191, the electrical influence between the data line 171 and the pixel electrode 191 may be prevented. In addition, since the shielding electrode 195 is disposed between the gate voltage supply line 127 and the pixel electrode 191, the electrical influence between the gate voltage supply line 127 and the pixel electrode 191 may be prevented.

Hereinafter, a display device according to an embodiment will be described with reference to FIG. 16.

Figure 16:
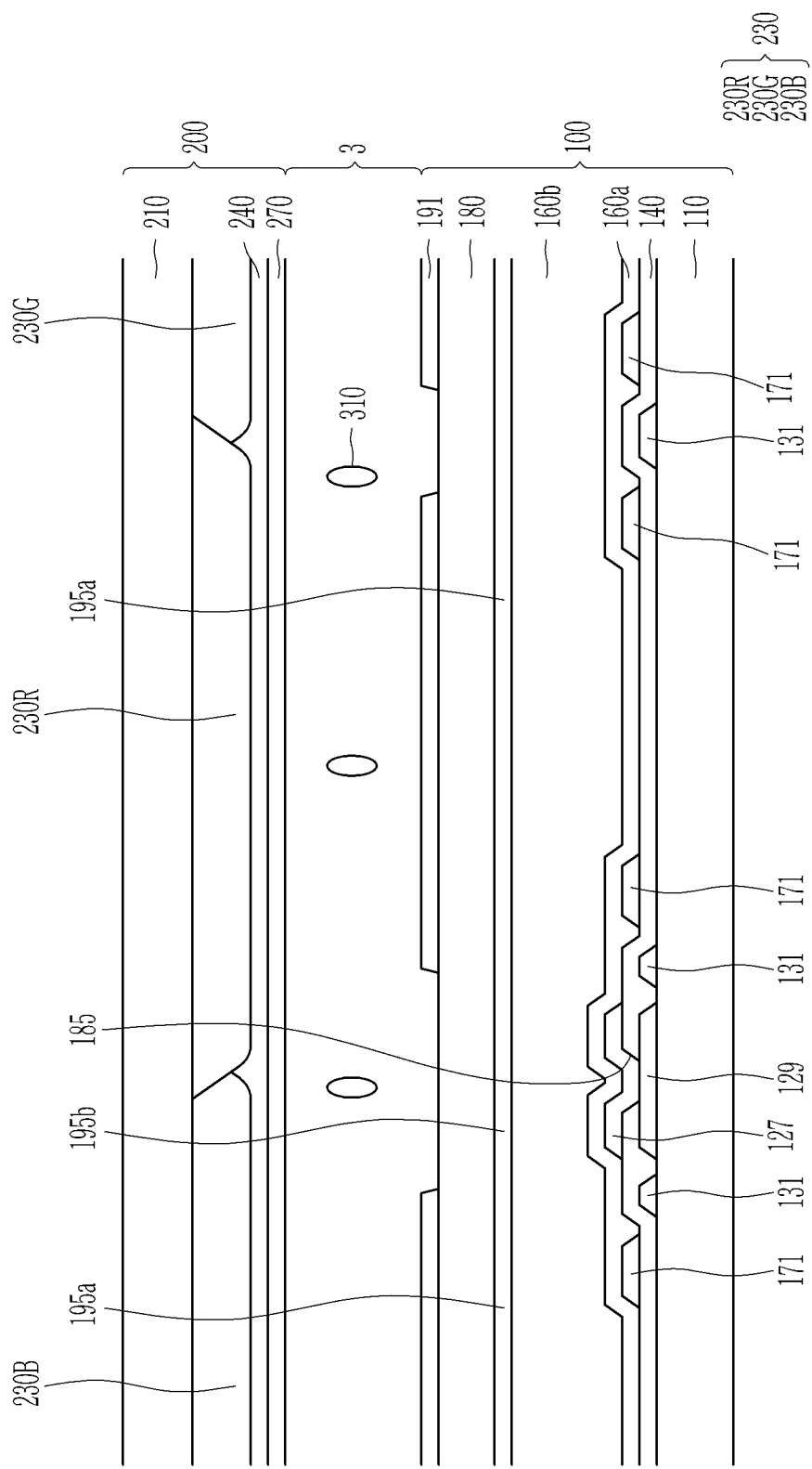
FIG. 16 illustrates a cross-sectional view of a portion of a display device according to an embodiment.

Since many portions of the display device according to the embodiment of FIG. 16 are the same as those of the display device according to the embodiment of FIG. 1 to FIG. 9, a repeated description of the portions will be omitted. The present embodiment differs from the previous embodiment in that the color filter is disposed on the second display panel instead of the first display panel, which will be further described below.

FIG. 16 illustrates a cross-sectional view of a portion of a display device according to an embodiment.

The display device according to the embodiment includes the first substrate 110, and the gate line 121, the gate voltage supply line 127, the data line 171, the thin film transistor Q, the shielding electrode 195, and the pixel electrode 191 that are disposed on the first substrate 110.

In the previous embodiment, the first passivation layer 160a, the color filter 230, and the second passivation layer 160b are disposed between the data line 171 and the shielding electrode 195, while in the present embodiment, the first passivation layer 160a and the second passivation layer 160b are disposed between the data line 171 and the shielding electrode 195.

In the present embodiment, the second display panel 200 may include a color filter 230 disposed on the second substrate 210. The color filter 230 may include a first color filter 230R, a second color filter 230G, and a third color filter 230B. Although not shown, a light blocking member may be disposed at a boundary between the first color filter 230R and the second color filter 230G, at a boundary between the second color filter 230G and the third color filter 230B, and at a boundary between the third color filter 230B and the first color filter 230R. A common electrode 270 may be disposed on the color filter 230. An overcoat 240 may be further disposed between the color filter 230 and the common electrode 270.

In the previous and present embodiments, since the shielding electrode 195 is disposed between the data line 171 and the pixel electrode 191, the electrical influence between the data line 171 and the pixel electrode 191 may be prevented. In addition, since the shielding electrode 195 is disposed between the gate voltage supply line 127 and the pixel electrode 191, the electrical influence between the gate voltage supply line 127 and the pixel electrode 191 may be prevented.

While this disclosure has been described in connection with what is presently considered to be practical embodiments, it is to be understood that the inventive concept is not limited to the disclosed embodiments, but, on the contrary, is intended to cover various modifications and equivalent arrangements included within the spirit and scope of the appended claims.

<Description of symbols>

| | |
|---|---|
| Q: thin film transistor | 110: first substrate |
| 121: gate line | 124: gate electrode |
| 127: gate voltage supply line | 131: storage electrode line |
| 140: gate insulating layer | 154: semiconductor |
| 171: data line | 173: source electrode |
| 175: drain electrode | 195: shielding electrode |
| 195a: main electrode portion of shielding electrode | |

-continued

<Description of symbols>

| | |
|---|---|
| 195b: bridge portion of shielding electrode | |
| 195c: opening of shielding electrode | |
| 160a: first passivation layer | 160b: second passivation layer |
| 180: insulating layer | 181: pixel opening |
| 183, 185: opening | 191: pixel electrode |
| 210: second substrate | 230: color filter |
| 270: common electrode | |

What is claimed is:

1. A display device comprising:
a substrate;
a gate line disposed on the substrate and extending in a first direction;
a gate insulating layer disposed on the gate line;
a data line disposed on the gate insulating layer and extending in a second direction crossing the first direction;
a gate voltage supply line disposed on the gate insulating layer and extending in the second direction, the gate voltage supply line connected to the gate line;
a passivation layer disposed on the data line and the gate voltage supply line;
a shielding electrode disposed on the passivation layer;
an insulating layer disposed on the shielding electrode; and
a pixel electrode disposed on the insulating layer and overlapping the shielding electrode, wherein the shielding electrode includes
a main electrode portion overlapping the pixel electrode, and
a bridge portion disposed between adjacent main electrode portions and extending from the main electrode portion, wherein the main electrode portion further overlaps the data line and does not overlap the gate voltage supply line.

2. The display device of claim 1, wherein
the gate voltage supply line is disposed on a same layer as the data line.

3. The display device of claim 1, further comprising
a liquid crystal layer disposed on the pixel electrode, and
a common electrode disposed above or below the liquid crystal layer,
wherein a same common voltage is applied to the common electrode and the shielding electrode.

4. The display device of claim 1, wherein
the bridge portion overlaps the gate voltage supply line.

5. The display device of claim 4, wherein
the bridge portion extends in the first direction, and
a width of the bridge portion is narrower than a width of the gate voltage supply line.

6. The display device of claim 4, wherein
the bridge portion does not overlap the pixel electrode.

7. The display device of claim 1, further comprising
pixels arranged in a matrix form along the first direction and the second direction to be connected to the gate line and the data line,
wherein three pixel columns in which pixels are arranged along the second direction are disposed between adjacent gate voltage supply lines, and
the main electrode portion overlaps three pixel electrodes.

8. The display device of claim 7, wherein
the gate voltage supply line is connected to two gate lines,
one pixel column is connected to two data lines to which data voltages of different polarities are applied, and
the main electrode portion overlaps six data lines.

9. The display device of claim 1, further comprising
pixels arranged in a matrix form along the first direction and the second direction to be connected to the gate line and the data line,
wherein one pixel column in which pixels are arranged along the second direction is disposed between adjacent gate voltage supply lines, and
the main electrode portion overlaps one pixel electrode.

10. The display device of claim 9, wherein
the gate voltage supply line is connected to two gate lines,
one pixel column is connected to two data lines to which data voltages of different polarities are applied, and
the main electrode portion overlaps two data lines.

11. The display device of claim 1, further comprising
a thin film transistor connected to the gate line and the data line, and
an opening in the shielding electrode so as to overlap the thin film transistor.

12. The display device of claim 11, wherein
the thin film transistor includes
a gate electrode connected to the gate line,
a source electrode connected to the data line, and
a drain electrode connected to the pixel electrode, and
a pixel opening in the passivation layer and the insulating layer so as to overlap the drain electrode and the pixel electrode is further included,
wherein the pixel electrode is connected to the drain electrode through the pixel opening, and
the opening overlaps the pixel opening.

13. The display device of claim 12, wherein
the opening surrounds the pixel opening.

14. The display device of claim 1, wherein
the shielding electrode includes a transparent metal oxide.

15. A display device comprising:
a substrate;
a gate line and a data line disposed on the substrate and crossing each other;
a gate voltage supply line disposed on the same layer as the data line and connected to the gate line;
a thin film transistor connected to the gate line and the data line;
a pixel electrode connected to the thin film transistor; and
a shielding electrode disposed between the data line and the pixel electrode, wherein the shielding electrode includes
a main electrode portion overlapping the pixel electrode, and
a bridge portion disposed between adjacent main electrode portions and extending from the main electrode portion, wherein the main electrode portion further overlaps the data line and does not overlap the gate voltage supply line.

16. The display device of claim 15, wherein
the bridge portion overlaps the gate voltage supply line and does not overlap the pixel electrode, and
a width of the bridge portion is narrower than a width of the gate voltage supply line.

* * * * *